US012179212B2

(12) United States Patent
Guerrero Palma

(10) Patent No.: US 12,179,212 B2
(45) Date of Patent: Dec. 31, 2024

(54) DEVICE AND METHOD FOR MILLING INPUT MATERIAL

(71) Applicants: thyssenkrupp Industrial Solutions AG, Essen (DE); thyssenkrupp AG, Essen (DE)

(72) Inventor: Pedro Guerrero Palma, Lippetal (DE)

(73) Assignees: thyssenkrupp Polysius GmbH, Beckum (DE); thyssenkrupp AG, Essen (DE)

( * ) Notice: Subject to any disclaimer, the term of this patent is extended or adjusted under 35 U.S.C. 154(b) by 301 days.

(21) Appl. No.: 17/792,678

(22) PCT Filed: Jan. 8, 2021

(86) PCT No.: PCT/EP2021/050209
§ 371 (c)(1),
(2) Date: Jul. 13, 2022

(87) PCT Pub. No.: WO2021/144191
PCT Pub. Date: Jul. 22, 2021

(65) Prior Publication Data
US 2023/0042116 A1 Feb. 9, 2023

(30) Foreign Application Priority Data
Jan. 14, 2020 (BE) .................................. 2020/5020
Jan. 14, 2020 (BE) .................................. 2020/5022
(Continued)

(51) Int. Cl.
*B02C 4/02* (2006.01)
*B02C 4/32* (2006.01)

(52) U.S. Cl.
CPC . *B02C 4/02* (2013.01); *B02C 4/32* (2013.01)

(58) Field of Classification Search
CPC .................................. B02C 4/02; B02C 4/32
See application file for complete search history.

(56) References Cited

U.S. PATENT DOCUMENTS 4,074,866 A * 2/1978 Meder ....................... B02C 4/32 241/231
6,685,118 B1 2/2004 Williams, Jr.
2018/0272355 A1 9/2018 Hoffmann et al.

FOREIGN PATENT DOCUMENTS

CN 2296764 Y 11/1998
CN 104 998 714 A 10/2015
(Continued)

OTHER PUBLICATIONS

English translate (DE3818540A1), retrieve date Jun. 20, 2024.*
English Translation of International Search Report Issued in PCT/EP2021/050209 dated Mar. 9, 2021.

*Primary Examiner* — Matthew Katcoff
*Assistant Examiner* — Mohammed S. Alawadi
(74) *Attorney, Agent, or Firm* — thyssenkrupp North America, LLC

(57) ABSTRACT

A roller press device for milling input material may include a fixedly mounted fixed roller having a roller shaft mounted at least approximately in a fixed position, a loosely mounted loose roller having a roller shaft that can be arranged in a variable position, a frame supporting at least the fixed roller and optionally also the loose roller, and a force application unit acting on the loose roller at a force application point. The fixed and loose rollers can be mounted and positioned relative to one another for applying a milling force. The loose roller may be mounted so as to pivot about a pivot axis in a manner of a one-sided lever such that the relative position of the loose roller relative to the fixed roller can be defined by said pivot movement. The one-sided lever may be formed between the pivot axis and the force application point.

16 Claims, 7 Drawing Sheets

(30) Foreign Application Priority Data

| | | |
|---|---|---|
| Jan. 14, 2020 | (BE) | 2020/5023 |
| Jan. 14, 2020 | (DE) | 10 2020 200 401.3 |
| Jan. 14, 2020 | (DE) | 10 2020 200 402.1 |
| Jan. 14, 2020 | (DE) | 10 2020 200 404.8 |

(56) References Cited

FOREIGN PATENT DOCUMENTS

| | | | | | |
|---|---|---|---|---|---|
| CN | 108187802 | A | | 6/2018 | |
| DE | 32 24 249 | A1 | | 1/1983 | |
| DE | 37 24 742 | A1 | | 2/1989 | |
| DE | 3818540 | A1 | * | 12/1989 | |
| DE | 10 2013 010 220 | A1 | | 12/2014 | |
| DE | 10 2015 110 033 | A1 | | 12/2016 | |
| DE | 10 2015 114 992 | A1 | | 3/2017 | |
| DE | 10 2015 114 998 | A1 | | 3/2017 | |
| GB | 2 103 107 | A | | 2/1983 | |
| GB | 2 116 072 | A | | 9/1983 | |
| GB | 2116877 | A | * | 10/1983 | B02C 4/32 |
| JP | S 5235364 | A | | 3/1977 | |

* cited by examiner

Fig. 1 - Prior art

DEVICE AND METHOD FOR MILLING INPUT MATERIAL

CROSS REFERENCE TO RELATED APPLICATIONS

This application is a U.S. National Stage Entry of International Patent Application Serial Number PCT/EP2021/050209, filed Jan. 8, 2021, which claims priority to German Patent Application No. DE 10 2020 200 404.8, filed Jan. 14, 2020; Belgium Patent Application No. BE 2020/5022, filed Jan. 14, 2020; German Patent Application No. DE 10 2020 200 401.3, filed Jan. 14, 2020; Belgium Patent Application No. BE 2020/5020, filed Jan. 14, 2020; German Patent Application No. DE 10 2020 200 402.1, filed Jan. 14, 2020; and Belgium Patent Application No. BE 2020/5023, filed Jan. 14, 2020, the entire contents of all of which are incorporated herein by reference.

FIELD

The present disclosure generally relates to milling, including apparatuses and methods for grinding feedstock.

BACKGROUND

Feedstock such as limestone, clinker, ore or similar rocks is ground for example by means of roller presses. The rollers are usually fixedly mounted on the one hand and mounted so as to be displaceable in a translatory manner on the other hand. A hydraulic force exerted on the floating roller, which is mounted in a floating manner, in the direction of the grinding gap brings about a translational displacement relative to the contact point of the rollers, or an action of force in the grinding gap. In particular, the floating roller is acted on at least at two points in the translatory direction, also in order to be able to prevent torques.

Expressed differently: Roller presses usually comprise a fixedly mounted roller and a floating roller mounted in a floating manner, with the floating roller being displaceable in a translatory manner relative to the fixed roller, and with the rollers being mounted and supported in a frame. For example, a lower and an upper frame part are provided, on each of which a (translational) plain bearing for the floating roller is provided. In addition to hydraulic actuators for the relative positioning of the floating roller with respect to the fixed roller, additional stabilizing actuators are often also required.

In particular also in the case of comparatively large roller presses and large acting forces and moments or impulses, in design terms it is not trivial to design a roller press for the widest possible range of operating states or different feedstocks. The question of how reaction forces can or should be transmitted from the rollers to the frame and conveyed to the stand constitutes a great deal of engineering effort. In this respect, the design requirements are in particular also high with regard to a high degree of continuous loading. Irrespective of its size, the roller press must also be as robust as possible in terms of skewed running, excessive load or similar adverse effects. For example, in the case of many roller types precise settability and precise relative alignment of the roller axes therefore likewise remains an important factor in terms of the selection of an advantageous overall design concept. In particular, it must be possible to precisely position the axes of the roller press, in particular relative to one another, as far as possible within a minimally narrow tolerance range. In other words: High dynamic continuous loading in combination with narrow tolerance ranges for the relative position of the rollers is based on high design requirements.

Therefore, the outlay that has to be invested in the conceptual design of the frame (support structure) and in the support of the force introduction points, and also in view of advantageous force flow paths, is also comparatively high. Not least on account of the fluctuating, sometimes unknown composition and hardness of the feedstock, the roller presses and the bearings used are subject to very high loading and stresses, even if they were designed with a large safety factor. For example, in existing apparatuses, skewed running cannot be effectively avoided in all cases, or else a certain degree of skewed running that is desired within the narrowest possible tolerance limits cannot be set precisely enough. This is a question of skewed running of one of the axes (in particular the contact axis) in the range of 0 to 10 millimeters (mm) or at most 15 mm, for example. On the one hand, a small degree of skewed running may well be desired (in particular in order to compensate for material impinging the roller irregularly), and, on the other hand, the skewed running should not become too great, in particular since this could adversely affect the efficiency of the grinding. This example makes it clear that the highest demands are placed on the quality of the design, support and mounting, in particular also in the case of roller presses in the upper performance range.

The drive power of the roller presses which tend to be rather large and heavy is, for example, in the range of 2×150-200 kW, i.e. a total of 350 kW, for example, but can also be significantly higher still, for example 2×3000 kW. In this respect, the spatial dimensions in each of the three spatial directions can be two to four meters, for example. However, significantly larger or smaller structures can also be implemented or are in use; in particular, scaling may be performed individually for a respective use case, depending on the feedstock to be treated. The present invention is largely scalable regardless of the respective roller type; the present invention has a particularly advantageous effect in particular in the case of comparatively large roller presses.

DE 10 2015 114 992 A2 describes a roller press for the grinding of grinding stock, with the rollers being mounted in such a way that it is possible to make it easier to change the rollers, in particular in that a line of action of a resulting operating force extends in a half-space within a supporting structure, with a/the floating roller interacting with pivoting devices, which pivot in the form of a two-sided lever about a pivot bearing.

Likewise, DE 10 2015 114 998 A2 describes a roller press for the grinding of grinding stock, with the rollers being mounted for simplified changing of the floating roller, in particular with a pivot axis of a two-sided lever advantageously arranged below a force action point at one end of the lever, and with the axis of the floating roller below the pivot axis.

The floating rollers of these roller presses are therefore not mounted in a purely translatory manner, but can be pivoted.

DE 37 24 742 A1 discloses a roller crusher with a fixed roller and a floating roller. DE 32 24 249 A1 discloses a roller mill having two rollers with a settable nip.

GB 2 103 107 A discloses a securing apparatus for a grinding roller.

DE 38 18 540 A1 discloses a rolling mill with an adjustable nip.

CN 104 998 714 A discloses a machine, the machine having a drive roller and a driven roller which are connected to the center part of a circle-center connecting line. The ends of the drive roller and the driven roller are connected coaxially with an end shaft. A pivot arm is mounted on a rotating shaft via a pivot shaft. The rotary shaft is mounted on a pivot bearing seat. An output shaft is connected to a step-down gear mechanism mounted on the pivot arm. A pivot arm pressure plate is connected to a top part of a machine frame and fills a compressed-air bag with gas.

DE 10 2013 010 220 A1 discloses a high-pressure roller press with pendular suspension.

DE 10 2015 110 033 A1 discloses a material-bed roller mill having two counter-rotating rollers and two roller holders connected pivotably to the stand.

Yet a need exists for an even more expedient structure, in particular for comparatively massive, large-volume roller apparatuses.

DETAILED DESCRIPTION

Figure 1:
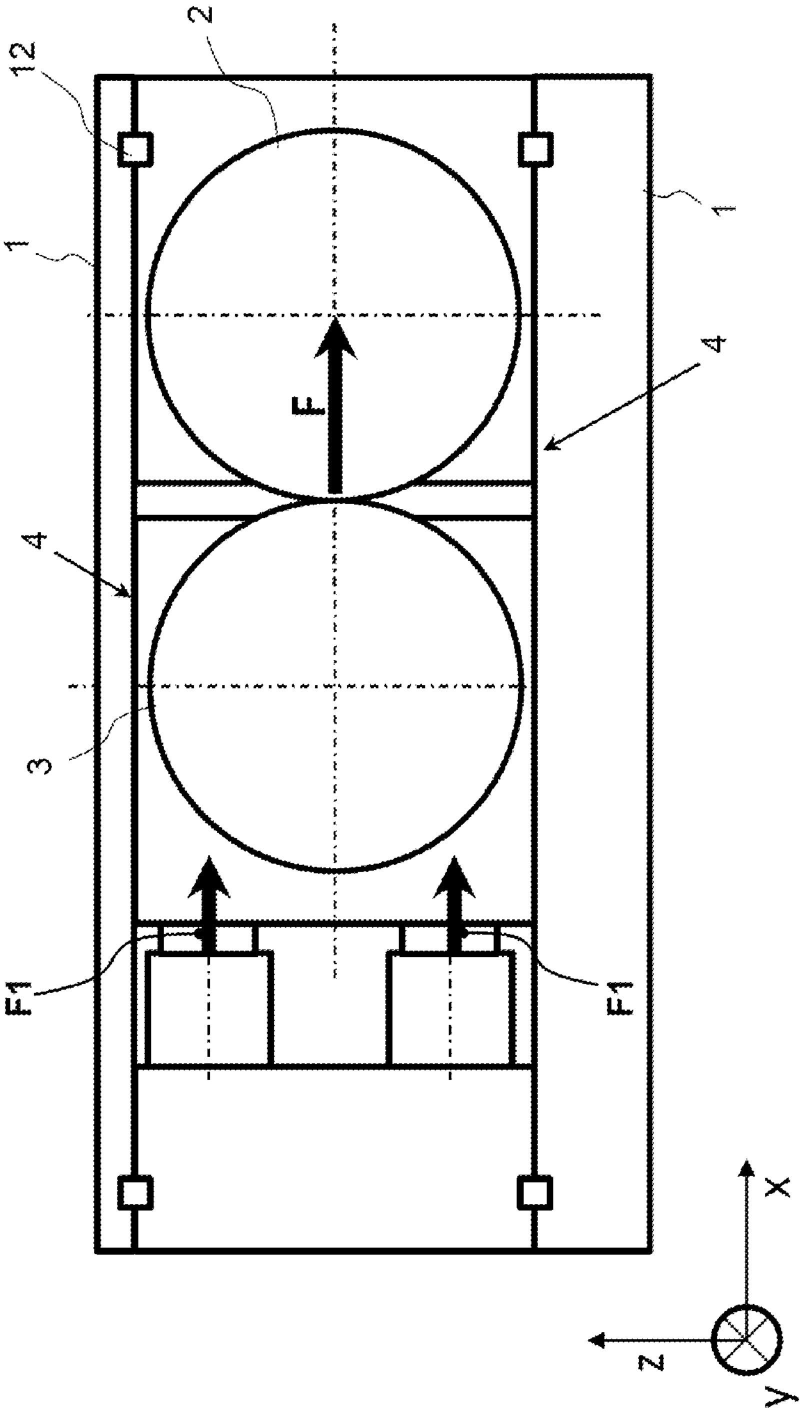
FIG. 1 is a schematic view of a prior art roller press arrangement.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to an apparatus and a method for grinding feedstock, in particular an apparatus in the form of a roller mill, having a fixedly mounted fixed roller and a floating roller mounted in a floating manner, the floating roller being displaceable relative to the fixed roller. In this respect, the rollers can be mounted and supported on a frame, in particular together on a common frame. In particular, this concerns roller press apparatuses in the form of material-bed roller mills for feedstock in the form of minerals or extracted material. In particular, this concerns what are referred to as roller presses, for example having a drive power in the range of at least 200 kW to 5 000 kW. In particular, the present disclosure relates to an apparatus and a method according to the preamble of the respective independent or alternative independent claim.

The object of the invention is to provide an apparatus and a method having the features described in the introduction, which make it possible to further optimize the grinding of feedstock, or which make it possible to use individual rollers for grinding feedstock in combination with one another in a particularly expedient manner. In particular, another object is to provide a robust apparatus, even in the event of comparatively high reaction forces and heavy loading, with a structural design that is as simple and robust as possible, which also makes it possible to reduce or even largely avoid skewed running, or which makes it possible to define a degree of skewed running at least within a very narrow tolerance range. Not least, there is also an interest here in a solution that is as cost-effective as possible and has the simplest possible design for robust, durable system technology.

This object is achieved by an apparatus and a method according to the independent patent claims. Advantageous exemplary embodiments are set out in the dependent claims.

According to the invention, this object is achieved in particular by a roller press apparatus configured for grinding feedstock (for example, grinding stock in the form of minerals), in particular in the form of a roller mill, specifically a material-bed roller mill, having: a fixedly mounted fixed roller with an at least approximately positionally fixedly mounted roller axis; a floating roller mounted in a floating manner with a roller axis that is positionally variably arrangeable in a predefinable relative position with respect to the fixed roller; a frame on which at least the fixed roller and optionally also the floating roller are mounted; at least one force action unit acting on the floating roller at a force action point; wherein the fixed and floating rollers can be mounted and positioned relative to one another, in particular by means of the force action unit, for the purpose of applying a grinding force (resulting rolling force in the grinding gap) and making mutual contact at a roller contact point or defining a grinding gap for the feedstock; and wherein the floating roller with the positionally variable roller axis can be/is mounted so that it can pivot about a pivot axis in the manner of a one-sided lever against the fixed roller in such a way that the relative position of the floating roller (or the positionally variable roller axis) can be defined relative to the fixed roller for the purpose of applying the grinding force as a result of this one-sided pivoting movement about the pivot axis, wherein the one-sided lever is formed between the pivot axis and the force action point. This provides a robust arrangement on the one hand, and enables a comparatively stress-free, variable positioning of the rollers relative to one another. In particular, it is also possible to ensure high efficiency, in particular also energy efficiency. In this case, especially high design requirements can also be met in an elegant, simple manner.

It has been shown that the pivotable mounting of the floating roller also provides great advantages in terms of force introduction and force application, in particular in the case of very massive rollers. In particular, the forces provided (in particular hydraulic forces) can be utilized efficiently and effectively. In particular, the amount of force required, and thus ultimately also the energy required, can be minimized. Not least, the apparatus as a whole can also be given a narrower design by virtue of optimized power flow paths, i.e. with less outlay in terms of material and costs and total weight. Conversely, a hydraulic force to be installed can also be minimized; the outlay on hydraulic fittings and pressure-resistant lines and adapters can be noticeably reduced. Expressed differently: The positionally variable roller axis can be positioned pivotably in the grinding gap with a comparatively small actuation force. In this case, the pivot axis in particular also defines a fulcrum of the one-sided lever. Here, the positionally fixed roller axis can optionally also be/remain fully positionally fixed without any displacement mechanism being provided, i.e. for all conceivable operating conditions or operating states.

In this respect, a floating roller in a broader sense is to be understood to mean that roller which can be positioned actively relative to the fixed roller and is also mounted positionally displaceably for a relative displacement. Equally, in this respect a fixed roller is to be understood analogously to mean a roller which is positionally fixedly mounted without the intention of positional displacement. In a special case described further later on, the fixed roller may also be mounted in a pivot bearing. The terms chosen here for fixed mounting and floating mounting are independent of any mechanical or kinematic requirements for static/dynamic specifications. The terms chosen here primarily serve to illustrate the two different roller types.

According to the invention, the pivot axis is arranged on the tangent of the fixed roller and the floating roller at the roller contact point, provided that there is a roller contact point through direct contact of the fixed roller and the floating roller as a result of a grinding gap of zero. If the grinding gap is not zero, the pivot axis is arranged between the tangent of the fixed roller at the intersection point of the connecting line between the positionally fixedly mounted roller axis and the positionally variably arrangeable roller axis and the tangent of the floating roller at the intersection point of the connecting line between the positionally fixedly mounted roller axis and the positionally variably arrangeable roller axis. Within the context of the invention, between the tangents also includes lying on at least one of the tangents, this resulting in particular in the special case of a grinding gap of zero, since in this special case the two tangents coincide and the pivot axis is thus arranged on the two coinciding tangents. However, even in the case of a non-zero grinding gap, the pivot axis may lie in particular on the tangent of the fixed roller at the intersection point of the connecting line between the positionally fixedly mounted roller axis and the positionally variably arrangeable roller axis, since this would allow a variable grinding gap from zero. In particular, the grinding gap is small compared to the diameter of the fixed roller and the diameter of the floating roller, with the result that the tolerances can include the assumption of a grinding gap of zero.

In particular cases when the fixed roller and the floating roller interlock, the grinding gap can also assume negative values, and in that case is limited at most to the interlocking depth of the rollers.

The arrangement according to the invention in particular also makes it possible for the frame to be able to be used advantageously. In particular, conventional, proven configurations and designs of the frame can also be implemented for the arrangement according to the invention.

The arrangement according to the invention is preferably configured for drive powers in the range of at least 200 kW to 5 000 kW. The bearings used are in particular configured for intercepting and conveying impulses and reaction forces exerted on the rollers and bearings by grinding stock in the form of minerals or stones or the like during the grinding. Measures that are advantageous or feasible in terms of system engineering, process engineering and design can be specified or restricted by this area of application. A person skilled in the art must also look for especially adequate measures specifically for the desired field of application.

Advantageously, a (purely) mechanical suppression of skewed rolling can be dispensed with in a roller apparatus according to the invention. Hydraulic measures for suppressing skewed rolling can also be at least partially dispensed with. In particular, the arrangement according to the invention also provides the advantage that skewed rolling can be effectively reduced or even completely avoided solely by virtue of the way in which the rollers are mounted relative to one another and by virtue of a pivoting movement of the floating roller.

In this respect, a one-sided lever or a one-sided lever arrangement is to be understood to mean an arrangement in which only one end of the lever is pivoted, and the lever is arranged on the other side in the pivot bearing. The load arm and force arm coincide. In the case of the one-sided lever, only one end of the lever has a force acting on it. There is only one force action point, and pivoting the lever does not result in an action of force on or creation of torque at the other end of the lever. Rather, a rotary bearing for pivoting the lever about the rotary bearing is provided at the other end (fulcrum). An action point or an interaction point or a mechanical interface is arranged on the line segment between the pivot bearing and the end of the lever. Expressed differently: There is no opposing pivoting movement. By contrast, in the case of a two-sided lever arrangement, two ends of a lever are pivoted with one another, i.e. the one end performs a relative pivoting movement and the other end likewise performs a relative pivoting movement, with the result that the relative length of the two lever arms is important.

Each force action point is arranged, for example, on a bearing jewel of the floating roller or between bearing jewels of the floating roller, and in the event of an action of force between the bearing jewels, the bearing jewels preferably become coupled, in particular in such a way that a hydraulic force can be transmitted to the bearing jewels via the coupling. For example, bearing bushes, roller bearings or similar rotary bearing elements may be provided as bearing jewels. The bearing jewels serve in particular to accommodate the bearings and to transmit the reaction forces to the bearings. A coupling between two or more bearing jewels is not imperatively necessary. If skewed running is to be prevented entirely, however, coupling the bearing jewels can be particularly expedient. Specifically, the coupling may be realized, for example, in that the two bearing jewels and at least one component for the coupling consist of a cast part. The coupling may also be realized by connecting (for example by screws) a steel tube/steel frame to the bearing jewels. When bearing jewels are coupled, the force action point can, for example, lie between the two bearing jewels, or else one force action point is provided in any case for each bearing jewel.

It has been shown that the use of multiple (at least two) hydraulic cylinders can be particularly advantageous in individual usage situations, in particular each coupled to a bearing jewel, with the result that each side or each bearing jewel defines a force action point. This makes it possible to dispense with coupling the bearing jewels to one another.

The invention is also based on the concept of using a one-sided lever arrangement to ensure that a floating roller is positioned relative to a fixed roller merely by way of translatory actuation. Rotational actuating movements or, for example, even the use of eccentrics are not necessary.

According to the invention, it is therefore possible to provide a comparatively narrow, simple design with comparatively few interacting components and few relative movements. As a result, design adaptation or scaling can also be carried out in a simple manner.

The terms "fixedly mounted" and "mounted in a floating manner" relate in this case in particular to an operating state for grinding feedstock. Expressed differently: During grinding, the fixed roller is usually not displaced, but can nevertheless be mounted in such a way that the fixed roller can be displaced, for example for assembly purposes. By contrast, usually only the floating roller is positioned for the grinding operation. Optionally, however, the inventive concept can also be transferred to two rollers that are mounted in a floating manner with respect to one another.

According to one exemplary embodiment, the roller press apparatus is in the form of a material-bed roller mill. It has been shown that the advantages according to the invention that are described here can in particular also be realized especially advantageously in the case of a material-bed roller mill.

In a further embodiment of the invention, the distance $r_{dist}$ between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis corresponds to at least 0.15 times the sum of the radius of the fixed roller $r_{fixed}$ and the radius of the floating roller $r_{floating}$ and at most 1 time the sum of the radius of the fixed roller $r_{fixed}$ and the radius of the floating roller $r_{floating}$. The result is therefore:

$$0.15\cdot(r_{fixed}+r_{floating})\le r_{dist}\le 1\cdot(r_{fixed}+r_{floating})$$

This enables a compact and stable construction.

The distance $r_{dist}$ between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis particularly preferably corresponds to at least 0.2 times the sum of the radius of the fixed roller $r_{fixed}$ and the radius of the floating roller $r_{floating}$ and at most 0.8 times the sum of the radius of the fixed roller $r_{fixed}$ and the radius of the floating roller $r_{floating}$. The result is therefore:

$$0.2\cdot(r_{fixed}+r_{floating})\le r_{dist}\le 0.8\cdot(r_{fixed}+r_{floating})$$

The distance $r_{dist}$ between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis very particularly preferably corresponds to at least 0.25 times the sum of the radius of the fixed roller $r_{fixed}$ and the radius of the floating roller $r_{floating}$ and at most 0.75 times the sum of the radius of the fixed roller $r_{fixed}$ and the radius of the floating roller $r_{floating}$. The result is therefore:

$$0.25\cdot(r_{fixed}+r_{floating})\le r_{dist}\le 0.75\cdot(r_{fixed}+r_{floating})$$

The distance $r_{dist}$ between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis even more particularly preferably corresponds to at least 0.25 times the sum of the radius of the fixed roller $r_{fixed}$ and the radius of the floating roller $r_{floating}$ and at most 0.6 times the sum of the radius of the fixed roller $r_{fixed}$ and the radius of the floating roller $r_{floating}$. The result is therefore:

$$0.25\cdot(r_{fixed}+r_{floating})\le r_{dist}\le 0.6\cdot(r_{fixed}+r_{floating})$$

In a further embodiment of the invention, the distance between the pivot axis and the force action point corresponds to 1 to 5 times the distance between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis. In other words, the virtual lever between the force action point and the pivot axis is 1 to 5 times as long as the distance between the roller contact point and the pivot axis.

In a further, preferred embodiment of the invention, the distance between the pivot axis and the force action point corresponds to 1.5 to 4 times the distance between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis.

In a further, preferred embodiment of the invention, the distance between the pivot axis and the force action point corresponds to 1.5 to 3 times the distance between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis.

In a further, preferred embodiment of the invention, the distance between the pivot axis and the force action point corresponds to 1.75 to 2.75 times the distance between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis.

In a further, preferred embodiment of the invention, the distance between the pivot axis and the force action point corresponds to 2 to 2.5 times the distance between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis.

In a further embodiment of the invention, the angle between the vector between the pivot axis and the force action point and the vector between the pivot axis and the connecting line between the positionally fixedly mounted roller axis and the positionally variably arrangeable roller axis along a straight line lying at right angles to the connecting line between the positionally fixedly mounted roller axis and the positionally variably arrangeable roller axis and through the pivot axis is between 80° and 100°, preferably between 85° and 95°, particularly preferably the angle is 90°.

In a further embodiment of the invention, the grinding gap is not zero. In particular, the grinding gap can be set between a minimum value $x_{0,min}$ and a maximum value $x_{0,max}$ during grinding operation. In this embodiment, the shortest distance between the pivot axis is preferably set between half the minimum value $x_{0,min}$ and half the maximum value $x_{0,max}$. The minimum value $x_{0,min}$ can particularly preferably be zero.

In a further embodiment of the invention, the one-sided lever comprises the straight connecting line between the force action point and the pivot axis. Within the context of the invention, comprises is to be understood here to mean that the straight-line connection runs within the mechanical lever. Consequently, the force is guided directly and in a straight line through the one-sided lever. In particular, the one-sided lever is therefore not U-shaped or parabolic, resulting in the omission of the direct connecting line between the force action point and the pivot axis.

In a further embodiment of the invention, the positionally variably arrangeable roller axis runs through the one-sided lever.

In a further embodiment of the invention, the positionally variably arrangeable roller axis is spaced apart from the straight connecting line between the force action point and the pivot axis by at most 0.1 times the length of the straight connecting line between the force action point and the pivot axis; the positionally variably arrangeable roller axis is particularly preferably spaced apart from the straight connecting line between the force action point and the pivot axis by at most 0.02 times the length of the straight connecting line between the force action point and the pivot axis.

In a further embodiment of the invention, the force is made to act at the force action point at an angle of 75° to 105° in relation to the connecting line between the positionally fixedly mounted roller axis and the positionally variably arrangeable roller axis. The force is preferably made to act at the force action point at an angle of 85° to 95° in relation to the connecting line between the positionally fixedly mounted roller axis and the positionally variably arrangeable roller axis; the force is particularly preferably made to act at the force action point at an angle of 90° in relation to the connecting line between the positionally fixedly mounted roller axis and the positionally variably arrangeable roller axis. The force is particularly preferably made to act from bottom to top. A particularly compact structure is possible as a result.

According to one exemplary embodiment, the roller contact point is arranged in a section between the force action point and the pivot axis and/or is arranged at a distance from the pivot axis that is less than the length of the one-sided lever, wherein the roller contact point defines a/the load arm of the one-sided lever. In this respect, a contact point defined by feedstock can also be understood to mean a roller contact point, i.e. with an appreciably large grinding gap. Here, the roller contact point can also be understood to mean an effective force transmission point in the grinding gap.

According to one exemplary embodiment, the positionally variable roller axis can be displaced on a curved movement path relative to the fixed roller, in particular on a circular path. This also makes it possible, for example, to adjust the relative roller position in the grinding gap. In this respect, the positionally variable roller axis may be positionable relative to the fixed roller by a rotational actuating movement about the pivot axis.

According to one exemplary embodiment, the positionally variable roller axis is arranged in a lever section extending from the pivot axis between the force action point and the pivot axis, specifically at a distance from the pivot axis that is less than or equal to half the lever length. This also makes it possible to ensure an advantageous force distribution. The pivot axis and the force action point may form a lever arrangement in which the floating roller can be positioned about the pivot axis in the form of a one-sided lever, with the roller contact point being arranged at an effective lever distance from the pivot axis that is less than or equal to half the lever length between the force action point and the pivot axis. This enables a good force effect at the grinding point, in particular with comparatively low forces at the point acted upon.

According to one exemplary embodiment, the pivot axis is aligned at least approximately parallel to the positionally fixed roller axis. Optionally, the pivot axis is aligned precisely parallel to the positionally fixed roller axis and/or to the positionally variable roller axis.

According to one exemplary embodiment, the positionally variable roller axis can be pivoted about the pivot axis on a circular path, in particular with a precisely circular movement path about an instantaneous center arranged on the pivot axis (instantaneous center in a broader sense, since the pivot axis does not necessarily have to be displaceable). Optionally, the pivot axis or a corresponding pivot bearing can additionally also be displaceable in a translatory manner. Optionally, the movement path is not a circular path but a curve, which is flattened on account of superimposed translation. A translational displacement can provide further options for adapting operating parameters or for the relative arrangement of the roller axes. However, as concerns the size of a grinding gap, it is usually sufficient if it can be varied in the region of just a few millimeters, which can already be ensured simply by pivoting.

The positionally variable roller axis may be pivotable about the pivot axis in such a way that the positionally variable roller axis is positionable in at least two spatial directions (x, z) relative to the positionally fixed roller axis, in particular in each case with x and z coordinates (or x and z positions) differing from the positionally fixed roller axis. The variation in the z direction also provides the advantage that not only the size but also the geometry of the grinding gap can be varied. In particular, the grinding stock can advantageously be ground even when it is greatly inhomogeneous.

In this respect, bearing jewels that are not coupled to one another can, for example, also pivot to different extents, in particular in order to be able to set skewed running or an effect corresponding to that of skewed running. As a result, it is possible to create a grinding gap which does not run parallel but opens out differently from one end of the roller to the other end. As a result of this measure, a variation in terms of skewed-running effects is possible even in the case of non-coupled bearing jewels.

According to one exemplary embodiment, the floating roller is pivotably mounted within the frame (or on the inside of the frame) and is supported on the frame. This makes it possible, for example, for the frame to also at least partially provide a stand or the interface for a stand. In this context, an arrangement within the frame is also to be understood to mean an arrangement in which the frame is provided only on one side, in particular only on the bottom side of the rollers, in the z direction. In this context, an arrangement within the frame is in particular also to be understood to mean an arrangement in which the frame completely overlaps the rollers in at least one spatial direction. Here, the pivot axis may be arranged at a distance from at least one of the roller axes that is less than or equal to the distance between fixed bearings of the fixed roller and the positionally fixed roller axis. This promotes support in the frame. Furthermore, an advantageous force distribution can be ensured even in the case of comparatively short lever lengths.

According to one exemplary embodiment, at least one of the rollers is supported and mounted on the frame independently of the other roller, in particular in a plane running through the grinding gap. This also provides an advantageous arrangement in terms of power flow and relative movement paths.

According to one exemplary embodiment, at least one of the rollers is supported in a plane running through the grinding gap. Not least, this also provides good variability in terms of the arrangement of the force action point or in terms of the direction of action of the force.

According to one exemplary embodiment, when the rollers make contact at the roller contact point, the roller axes are arranged relative to the pivot axis in such a way that a connecting line through these three axes in a plane running orthogonally thereto forms a triangle, in particular a preferably at least approximately isosceles triangle, preferably with each base angle on the connecting line between the roller axes being less than 50 degrees, in particular less than 45 degrees, preferably less than 40 degrees, further preferably less than 35 degrees. Expressed differently: The three axes advantageously define an at least approximately isosceles triangle arrangement, in particular with the pivot axis as downwardly pointing apex. This symmetrical arrangement of the roller axes relative to the pivot axis, with the pivot axis at the smallest possible distance from the roller axes, also provides an advantageous lever ratio and can make it possible to simplify the design, in particular also allow common mounting (although preferably independently of one another) on the same pivot axis or at least approximately in the same position on the frame.

In this respect, the base angle of the (for example isosceles) triangle arrangement may also vary in a range of approximately 15°, preferably only 10° or only 5° around the values mentioned here. In particular, the base angle for a respective application may also be selected individually in a value range of 45° plus or minus 15°.

Here, an alignment of the one-sided lever (pivot angle alignment) may be less than 90°, in particular less than 45°, for example in the range from 20° to 40°, relative to the horizontal plane. According to one variant, the pivot angle alignment corresponds to the base angle of the triangle arrangement.

According to one exemplary embodiment, the pivot axis is arranged below the positionally fixed roller axis, in particular at a distance of at most half the roller diameter (maximum distance corresponds to the radius of the fixed roller and/or the floating roller). This also provides an advantageous arrangement with regard to the interaction of the action of force and gravitational forces.

The one-sided lever arrangement is advantageously configured in such a way that the gravitational force acting at the roller center of gravity or at the center of gravity of the entire pivotable arrangement acts counter to the action of force. Expressed differently: The load arm of the one-sided lever is defined on the one hand by the reaction force at the roller contact point and on the other hand also by the gravitational force acting at the center of gravity. The floating roller is thus mounted about the pivot axis on one side in such a way that both the reaction force at the roller contact point and the gravitational force counteract an action of force at the point acted upon (on the force arm of the lever). This provides good reactivity and can also improve the grinding regime, in particular in that the return movement (grinding gap becoming larger) is supported under the effect of gravitational force. In particular, since the gravitational force resets the roller or tends to open up the grinding gap rather than close it, a device for opening up the gap can also be dispensed with (minimized outlay on apparatus engineering).

According to one exemplary embodiment, the floating roller is pivotably mounted and arranged in such a way that the gravitational force acting at the center of gravity of the floating roller acts on the load arm of the one-sided lever in the direction of a return movement so as to enlarge the grinding gap. This also makes it possible to implement advantageous grinding behavior. In particular, good reactivity can be ensured and blocking or jamming scenarios in the event of especially hard or large feedstock, for example, can be effectively avoided.

According to one exemplary embodiment, the floating roller or the positionally variable roller axis is aligned at least approximately parallel to the fixed roller and is mounted in (at least) two bearing jewels, wherein the bearing jewels of the floating roller are fixed so that they can rotate at one point (in particular about the pivot axis) and are coupled at a further point (coupling point or support point). Such an optional coupling of the bearing jewels also makes it possible to particularly effectively combat skewed running. In this case, the further point (coupling point or support point) is preferably arranged spaced apart from the pivot axis.

Here, coupling can be effected in particular mechanically or hydraulically, in particular by means of a cross brace, cast element and/or torsion shaft (mechanical), or by means of a crosswise hydraulic cylinder (hydraulic).

According to one exemplary embodiment, a hydraulic cylinder (component of the force action unit) that acts or is aligned in the longitudinal direction is provided for each bearing jewel for the purpose of subjecting the floating roller to a force. (The) hydraulic cylinder(s) of the force action unit that act(s) on bearing jewels of the (respective) roller(s) can be connected on the oil side. The force action unit may comprise a hydraulic cylinder that acts or is arranged between two bearing jewels of the floating roller. Bearing jewels of the (respective) roller(s) may comprise a guide in the longitudinal direction of the bearing jewel. The guide serves in particular to hold the bearing jewels in a predefined plane, in particular in terms of a rotation, in particular in order to avoid twisting of the bearing jewels (axial forces in the x direction also act on the rollers). In this respect, the guide can stabilize or stiffen a parallelogram arrangement of the bearing jewels of the floating roller.

According to one exemplary embodiment, the floating roller can be hydraulically acted upon on one side tangentially about the floating roller at a further point (force action point) above or below the roller axis in such a way that the hydraulic action causes a torque about the pivot axis and in the process defines the grinding force/rolling force.

According to one exemplary embodiment, both the force action point and the pivot axis and also the fixed bearing for the fixed roller are arranged geometrically in such a way that a connecting line through these points or components, or an enclosed area correspondingly bounded by these points, runs geometrically at a horizontal distance of at most twice the roller diameter of the rollers (or the diameter of a/the relatively larger roller) and at a vertical distance of at most a factor of 1.5, in particular at most a factor of 1.2 of the roller diameter of the rollers or a/the relatively larger roller, in particular with the connecting line (contour, profile) or a corresponding area peripheral contour in cross section being orthogonal to the pivot axis in the form of a triangle or quadrilateral, in each case having corner angles of less than 180°.

This way of incorporating the individual components in the frame (or at least laterally on one side of a frame) also provides a compact and robust design. In terms of the force introduction directions and relative distances and lever ratios, it is nevertheless also still possible here to ensure an advantageously large range of variation in this respect. In the case of a fixed roller mounted on the pivot axis, the special case can also arise in which the bounded area is almost linear (i.e. extremely flat), or else, depending on the vertical arrangement (vertical position) of the pivot axis, takes on the geometry of a very flat, wide triangle with base angle(s) in the region of only a few degrees. Expressed differently: The introduction of force and the intercepting and conveying of reaction forces may be locally kept within a very narrow area (in particular an only one-sided frame), or the area bounded by the force points and bearing points is at least very compact and can be reduced to an advantageous geometric basic shape, which allows a compact, stable frame.

Therefore, according to one of the implementable variants, the invention is also based on the concept of forming a triangle of forces with advantageous lever lengths and with an advantageous arrangement of the force introduction points, with the bearing forces and reaction forces likewise being transmitted to this triangle of forces. In this respect, the longest side of the triangle of forces may be provided by the one-sided lever extending between the pivot axis and the action of force.

According to one exemplary embodiment, the roller contact point, the force action point and the pivot axis are arranged relative to one another in such a way that it is possible to set a lever ratio of the distance between the force action point and the pivot axis to the distance between the force action point and the roller contact point of at least a factor of 2. The positionally variable roller axis, the force action point and the pivot axis may be arranged relative to one another in such a way that it is possible to set a lever ratio of the distance between the force action point and the pivot axis to the distance between the positionally variable roller axis and the pivot axis of at least a factor of 2. In particular, this arrangement also provides high effectiveness and efficiency.

According to one exemplary embodiment, at least the floating roller is dimensioned and/or arranged in the frame in such a way that a free space in the z direction in relation to the frame is ensured. The dimensions of the structure displaced with the floating roller in the z direction may be smaller than the dimensions of the fixedly mounted structure of the fixed roller in the z direction. This makes it possible in particular also to provide a free space that is advantageous for a wide movement/pivoting range.

According to one exemplary embodiment, the floating roller is acted upon at a single action point or at least at a single radial distance in a tangential direction about the roller axis and about the pivot axis, in particular in a (hydraulic) direction of action at least approximately orthogonal to the roller axis, in particular in a vertical (z) or horizontal (x) direction of action in the case of horizontally aligned roller axes and a horizontally aligned plane (xy) through the roller axes.

According to one exemplary embodiment, the floating roller can be positioned so that it can pivot about the pivot axis relative to the fixed roller, in particular by setting a/the (preferably hydraulic) force at the action point that is aligned at least approximately tangentially on one side. Expressed differently: The force applied is skewed relative to the roller axis.

According to one exemplary embodiment, the floating roller can be positioned freely in the frame at least in one pivoting direction, in particular at least relative to a frame part on the bottom side or additionally also relative to a frame part on the top side of the frame. In particular, the frame part on the bottom side may be coupled directly to a stand.

According to one exemplary embodiment, the floating roller is mounted so that it can pivot about a/the pivot point (pivot axis), which is arranged in a plane exactly below or above the roller contact point of the fixed roller and the floating roller, i.e. exactly halfway between the two roller axes. Expressed differently: The pivot axis is arranged perpendicularly in line with the grinding gap. This also provides design advantages, not least in terms of the mounting of the fixed roller.

The roller press apparatus is advantageously configured to initiate the pivoting movement exclusively by way of a translatory actuation or action of force, that is to say without torque or without a rotational actuating movement. In particular, the force is made to act at least approximately in an orthogonal and/or parallel direction relative to the reaction force (contact force) on the rollers. Not least, this also provides comparatively simple, robust kinematics.

According to one exemplary embodiment, the pivot axis is arranged in a plane which extends parallel to the roller axes, in particular in a plane running through the grinding gap or precisely through the roller contact point, in particular in a plane running in the vertical direction. This arrangement which is symmetrical at least in the x direction relative to the roller axes provides advantages in terms of supporting the rollers and in terms of force flow, in particular even in the case of rollers that are at least approximately the same size. Here, the z position in the vertical direction can be selected largely freely, in particular with regard to a particularly advantageous frame design and/or an optionally common support of the two rollers on the pivot axis.

Optionally, the floating roller may be positioned/positionable relative to the fixed roller in such a way that the pivot axis is arranged in an x portion between the grinding gap (or the roller contact point) and the roller axis of the floating roller (i.e. offset in an x direction toward the positionally variable roller axis), in particular at an x distance from the positionally variable roller axis of at least ⅔ of the x distance between the positionally variable roller axis and the roller contact point or grinding gap (in particular at an x distance of at least ⅔ of the floating roller radius), preferably at least ¾ of this x distance. Not least, this also provides an advantageous force ratio. Expressed differently: A symmetrical x arrangement of the pivot axis in the grinding gap can optionally also be varied, in particular by way of an x offset in the direction of the positionally variable roller axis.

A triangle of forces that can be realized by the arrangement according to the invention is formed by the points P1, P2 and P3. The arrangement of the respective roller axis is less significant in this context. However, it can be mentioned that the area spanned by the triangle of forces preferably covers only the floating roller (or its cross-sectional area), and that the roller axis of the floating roller is optionally enclosed by the triangle of forces. Dimensioning aspects can also be taken into account for the selection of the lever ratios. The greater the distance P2/P3 is selected to be in relation to the distance P1/P3, the smaller the configuration of the hydraulic cylinders or force introduction actuators can be. However, in this case the loading at point P3 also increases. A ratio of at least approximately 1 to 2 can be preferred, in particular if the number of cylinders (actuators) should be as low as possible (in particular should be half that of the prior art, i.e. in particular that in the case of translatory actuation). In many cases, cost aspects are also of great importance, and therefore the ratio of the distances can also be optimized in cost terms. If the design costs for the mounting point P3 rise to a greater extent than the costs for the cylinders, the ratio is/will be selected to be smaller if anything, and vice versa. In this respect, in an individual case the ratio may also be selected in a range from for example 1:1 to 1:3, in particular 1:1.5 to 1:2.5, preferably 1:2. A person skilled in the art will be able to find an optimum for a respective usage situation on the basis of the present disclosure, depending on boundary conditions prioritized.

It has been shown that a/the contact line of the two rollers (without feedstock in the grinding gap) or the center line (central longitudinal axis) of the grinding gap exhibits the least change in height when the pivot axis is arranged close to the grinding gap in the x direction. That is to say, such a more or less in-line arrangement (in line in the z direction) of the center of the grinding gap and the pivot axis makes it possible to keep the two roller axes at least approximately in the same vertical position, even when the gap width varies. In this case, the grinding gap thus opens up as horizontally as possible, this also being advantageous with regard to a feed of material from above (feedstock supplied under the effect of gravitational force).

According to one exemplary embodiment, the force is made to act (preferably hydraulically) about the pivot axis by means of at least one plunger, in particular by means of a plunger with a tilting device, in particular by means of a plunger with a hydrostat as tilting device. This also promotes adjustment of hydraulic forces and positioning that is as precise as possible. The force action unit may comprise at least one plunger or plunger piston or valve piston, for example. Specifically in the case of a pivoting mechanism, plungers also offer the advantage of an especially compact structure. However, the cylinder type may be selected individually in each case so as to be optimized for the usage situation.

According to one exemplary embodiment, the pivot axis is arranged on the frame, in particular in a pivot bearing incorporated in the frame, in particular on a frame part on the bottom side. Not least, this also provides design advantages and has a favorable effect on the force flow/moment flow.

The fixed roller may be mounted in at least one bearing with the same z coordinate as the pivot axis, for example.

According to one exemplary embodiment, the fixed roller is mounted, in particular fixedly mounted, at least on a/the frame part on the bottom side and optionally also on a/the frame part on the top side of the frame. Expressed differently: Optionally, it is also possible for the fixed roller to be supported only on one side in the z direction. These possible variations, which can be realized in particular in comparison with a translatory plain bearing, also allow a single design concept for a multiplicity of applications without needing to restrict optimization measures.

According to one exemplary embodiment, the pivot axis is arranged at a distance (in particular z distance or vertical distance) from the positionally fixed and/or the positionally variable roller axis in at least one spatial direction that is less than or equal to the radius of the fixed roller and/or the floating roller, in particular less than a factor of 0.8 or less than 0.7 of the radius of the floating roller. This also provides an advantageous force distribution.

According to one exemplary embodiment, at least one fixed bearing of the fixed roller is arranged at the level of the pivot axis (the same z coordinate). It has been shown that this makes it possible to minimize moments of force, in particular in terms of forces in the x direction (grinding forces or reaction forces in the grinding gap). This also promotes an advantageous frame design.

According to one exemplary embodiment, the fixed roller is mounted in at least one bearing with the same z coordinate as the pivot axis, i.e. at the same vertical position. In particular, this provides an advantageous design arrangement even if the frame has only one side. The fixed bearing may also be configured in the manner of a stop for a pivoting movement or comprise the stop; in that case, the fixed bearing primarily functions as a stop.

A design configuration with a fixed bearing arranged at the level of the pivot axis for the purpose of generating a counterforce provides advantages in terms of force distribution and loading on the frame. The horizontal grinding force effects a horizontal reaction force on the bearing jewels of the floating roller and fixed roller. In the case of a design arrangement in which the bearing jewels can be connected to one another at the pivot point or close to the pivot point, it is possible to cancel out or compensate these reaction forces at these points. This means that other components, such as the base frame, for example, can be relieved of load or optionally also given a narrower configuration (with corresponding cost advantages).

In particular, the pivot axis is arranged in a pivot bearing formed by bearing components that are configured for the corresponding pivoting movement, in particular for pivoting movements in an angle range which is such that it is possible to set a gap between the two rollers of up to 200 mm, in particular for maximum gap sizes in the range between 80 mm and 200 mm depending on the type series. A plummer block is screwed to the base frame, for example. A bolt guided through the bearing bore connects bearing parts of the floating and fixed rollers. The pivot bearing is configured, for example, as a maintenance-free or especially low-maintenance pivot bearing with a woven Teflon fabric coating. During operation, the floating roller moves in a comparatively small angle range between +1-1 mm and +1-5 mm, for example. In this respect, the pivot bearing can be optimized for the load operating range of pivot angles in the range from +1-1 mm to +1-5 mm. Considerably larger pivot angles are not necessarily required, at least under load.

A maintenance-free pivot bearing is preferably installed in a pivot bearing housing. The housing is secured (in particular screwed, welded) to the base frame, for example. The pivot bearing may also be installed in a bearing jewel. The pivot axis is fixed on one side or both sides by a bearing jewel in the base frame, for example.

The fixed roller is supported or mounted on the frame, in particular in a frame part on the bottom side. The fixed roller may optionally also be supported or mounted on a frame part on the top side.

A description will be given below of aspects which are especially advantageous in particular in connection with an action of force at least approximately orthogonally to the direction of gravitational force. In this respect, the force is made to act exactly in the horizontal direction, for example. In the event of this type of force introduction, existing concepts can also be used. Expressed differently: Frames and actuators used up to now for translational displacement of the floating roller may optionally also be used for the pivot mounting according to the invention, or existing apparatuses can be converted or retrofitted.

According to one exemplary embodiment, the force is made to act in the same direction as the resulting grinding force/rolling force (contact force between the rollers), in particular with the force action point at least approximately at an effective lever distance which is at least twice as large as the lever distance between the pivot axis and the roller contact point. This also makes it possible to ensure good efficiency and delicate force meterability.

According to one exemplary embodiment, the lever force (in particular hydraulic force) applied at the force action point is aligned at least approximately in the direction of the grinding force, in particular exactly in the direction of the grinding force, in particular in the horizontal direction of action. This makes it possible to set and adjust the action at the contact point of the rollers particularly well.

Optionally, the hydraulic force deviates from the direction of the grinding force (contact force on the rollers) by at most 40°, preferably by at most 35°, further preferably by at most 30°, in a direction of action, in particular in a direction of action at least approximately parallel to the grinding force, in particular in a horizontal direction of action. This variability is an advantage, for example, when a wide range of sizes of the grinding gap is to be set.

A description is given below of aspects which are especially advantageous in particular in connection with an action of force at least approximately counter to the direction of gravitational force (parallel thereto), in particular vertically upward, in which case the corresponding actuator can be supported on the stand or on the bottom frame part for this.

According to one exemplary embodiment, the one-sided lever between the force action point and the pivot axis is formed by the relative arrangement of the roller contact point and the pivot axis and the force action point in such a way that the lever distance between the force action point and the pivot axis is greater than a factor of 2 of the distance between the positionally variable roller axis and the pivot axis. The effective lever distance between the force action point and the positionally variable roller axis may be greater than or equal to the effective lever distance between the positionally variable roller axis and the pivot axis, in particular greater by at least a factor of 1.2 to a factor of 1.5, for example a factor of 2. This also provides a good lever effect.

According to one exemplary embodiment, the floating roller is mounted by virtue of the action of force upward, in particular vertically upward, in particular orthogonally to the contact force at the roller contact point, counter to the weight force acting on the floating roller. Not least, this also provides good reactivity in terms of the positioning of the floating roller; this can also promote gentle mounting with a long service life. In this case, the lever length of the one-sided lever or force arm may be selected largely freely.

According to one exemplary embodiment, the force action unit is supported on the bottom side in the frame, in particular in a frame part on the bottom side. Not least, this also results in design advantages. In this respect, support on the bottom side is to be understood to mean a support below the roller axes. The frame part on the bottom side may be coupled/couplable to a stand. This also provides an advantageous force flow directly out of the frame, and therefore the frame can be given a comparatively narrow configuration.

According to one exemplary embodiment, the action of force (in particular hydraulic force) is not aligned in the direction of the grinding force/rolling force, but at an angle of greater than 45°, in particular deviating from the direction of the grinding force/rolling force by at least 50°, preferably at least 55°, further preferably at least 60° in a direction of action, in particular in a direction of action at least approximately orthogonal to the grinding force/rolling force, in particular in the vertical (z) direction of action. In this case, force is made to act on the floating roller in particular exclusively at a/the force action point below the roller axes. This also allows an advantageous arrangement of the individual components relative to one another in design terms.

A description is given below of aspects which are especially advantageous in particular in connection with an action of force at least approximately counter to the direction of gravitational force, specifically in the case of a frame which is open at the top and/or a fixed roller (also) mounted on the pivot axis. In the case of such an arrangement, the advantages of a comparatively direct force introduction into the stand can also be combined with the advantages of a cost-effective frame and good accessibility.

According to one exemplary embodiment, the fixed roller is mounted on a pivot axis, in particular about the same pivot axis as the floating roller, with the fixed roller in this case being prevented from making a pivoting movement in at least one fixed bearing, in particular in a fixed bearing (stop) for conveying grinding forces/roller contact forces. This also makes it possible to realize especially narrow designs, in particular without a frame part on the top side. In this special case, the term "fixed roller" is therefore to be interpreted to mean that the fixed roller is the roller on which a reaction force caused by the action of force on the floating roller is exerted.

The fixed roller should not be displaced in this case; nevertheless, it can be advantageous to likewise mount the fixed roller in a/the pivot bearing, although this mounting is intended to convey the reaction forces into the frame without a relative movement of the fixed roller (in particular via a stop).

The fixed roller may be supported in at least one fixed bearing at the same vertical coordinate as the pivot axis for the purpose of conveying grinding forces/roller contact forces. In particular, the fixed bearing is configured to take up forces in the circumferential direction about the pivot axis. The fixed bearing may in particular also comprise a stop.

The fixed roller may also be mounted on the pivot axis. Not least, this also has advantages in terms of compensating grinding forces and bearing forces.

According to one exemplary embodiment, the frame is configured without a frame part on the top side, in particular exclusively comprising at least one frame part on the bottom side, the rollers being supported and mounted on the bottom side. In this case, both the floating roller and the fixed roller can be supported and/or mounted in a frame part which extends exclusively below the roller axes. This also ensures an advantageous force flow/moment flow.

The features of the invention that are mentioned above relate to a concept which can be realized in different variants, in particular depending on the configuration of the frame and/or the direction of the action of force. It has been shown that the combinations of features described below can each per se ensure an especially large number of the advantages mentioned above.

ITEM1 The object mentioned above is achieved according to the invention in particular also by a roller press apparatus (10) configured for grinding feedstock (M), in particular in the form of a roller mill, having:

- a fixedly mounted fixed roller (2) with an at least approximately positionally fixedly mounted roller axis (y2);
- a floating roller (3) mounted in a floating manner with a roller axis (y3) that is positionally variably arrangeable relative to the fixed roller;
- a frame (11) on which at least the fixed roller and optionally also the floating roller are mounted;
- at least one force action unit (15) acting on the floating roller at a force action point (P2);

wherein the fixed and loose rollers can be mounted and positioned relative to one another, in particular by means of the force action unit, for the purpose of applying a grinding force (F) and making mutual contact at a roller contact point (P1) or defining a grinding gap (x0) for the feedstock; wherein the floating roller (3) with the positionally variable roller axis (y3) is mounted so that it can pivot about a pivot axis (P3) in the manner of a one-sided lever (16) in such a way that the relative position of the floating roller relative to the fixed roller can be defined by this pivoting movement, wherein the one-sided lever (16) is formed between the pivot axis (P3) and the force action point (P2), wherein the roller contact point (P1) is arranged in a section between the force action point (P2) and the pivot axis (P3) and/or is arranged at a distance from the pivot axis that is smaller than the length of the one-sided lever, and wherein the roller contact point (P1) defines a/the load arm (16.2) of the one-sided lever, wherein, when the rollers make contact at the roller contact point, the roller axes are arranged relative to the pivot axis in such a way that a connecting line through these three axes in a plane running orthogonally thereto (side view) forms a triangle or a triangle arrangement, preferably with each base angle on the connecting line between the roller axes being less than 50 degrees, in particular less than 45 degrees, preferably less than 40 degrees, further preferably less than 35 degrees, wherein the pivot axis (P3) is arranged below the positionally fixed roller axis (y2), wherein the roller contact point (P1), the force action point (P2) and the pivot axis (P3) are arranged relative to one another in such a way that it is possible to set a lever ratio of the distance between the force action point and the pivot axis to the distance between the force action point and the roller contact point of at least a factor of 2. This combination of features provides a large number of the advantages mentioned above, in particular also in the case of or for frame designs provided for floating rollers that are conventionally translationally displaced. This combination of features can be combined with the other features described here. Force is preferably made to act at least approximately in the same direction as (or in the opposite direction to) the resulting rolling force or the grinding force.

ITEM2 The object mentioned above is achieved according to the invention in particular also by a roller press apparatus (10) configured for grinding feedstock (M), in particular in the form of a roller mill, having:

- a fixedly mounted fixed roller (2) with an at least approximately positionally fixedly mounted roller axis (y2);
- a floating roller (3) mounted in a floating manner with a roller axis (y3) that is positionally variably arrangeable relative to the fixed roller;
- a frame (11) on which at least the fixed roller and optionally also the floating roller are mounted;
- at least one force action unit (15) acting on the floating roller at a force action point (P2);

wherein the fixed and floating rollers can be mounted and positioned relative to one another, in particular by means of the force action unit, for the purpose of applying a grinding force (F) and making mutual contact at a roller contact point (P1) or defining a grinding gap (x0) for the feedstock; wherein the floating roller (3) with the positionally variable roller axis (y3) is mounted so that it can pivot about a pivot axis (P3) in the manner of a one-sided lever (16) in such a way that the relative position of the floating roller relative to the fixed roller can be defined by this pivoting movement, wherein the one-sided lever (16) is formed between the pivot axis (P3) and the force action point (P2), wherein the action of force is aligned at an angle of at least 75° or at least 80° in relation to the grinding force, in particular at least approximately orthogonally to the direction of the grinding force, in particular in an at least approximately vertical plane, wherein the floating roller is at least partially, in particular completely, supported on the frame at the force action point. Expressed differently: The floating roller is on the one hand mounted in the pivot axis, and on the other hand the floating roller is supported on the other side of its center of gravity at least at one force action point on the frame, in particular on a respective frame part on the bottom side. This combination of features provides a great number of the advantages mentioned above, in particular also in terms of great design-related and procedural variability and reliable support (in particular also the coupling of forces to a stand), and also in terms of good reactivity of the floating roller. This combination of features can also be combined with the other features described here.

ITEM3 The object mentioned above is achieved according to the invention in particular also by a roller press apparatus (10) configured for grinding feedstock (M), in particular in the form of a roller mill, having:

- a fixedly mounted fixed roller (2) with an at least approximately positionally fixedly mounted roller axis (y2);
- a floating roller (3) mounted in a floating manner with a roller axis (y3) that is positionally variably arrangeable relative to the fixed roller;
- a frame (11) on which at least the fixed roller and optionally also the floating roller are mounted;
- at least one force action unit (15) acting on the floating roller at a force action point (P2);

wherein the fixed and floating rollers can be mounted and positioned relative to one another, in particular by means of the force action unit, for the purpose of applying a grinding force (F) and making mutual contact at a roller contact point (P1) or defining a grinding gap (x0) for the feedstock; wherein the floating roller (3) with the positionally variable roller axis (y3) is mounted so that it can pivot about a pivot axis (P3) in the manner of a one-sided lever (16) in such a way that the relative position of the floating roller relative to the fixed roller can be defined by this pivoting movement, wherein the one-sided lever (16) is formed between the pivot axis (P3) and the force action point (P2), wherein the action of force is aligned at an angle of at least 75° or at least 80° in relation to the grinding force, in particular at least approximately orthogonally to the direction of the grinding force, in particular in an at least approximately vertical plane, wherein the fixed roller is also mounted on the pivot axis. This combination of features provides a great number of the advantages mentioned above, in particular also in terms of a narrow frame design. This combination of features can also be combined with the other features described here.

The object mentioned above is achieved according to the invention in particular also by a method for grinding feedstock (for example grinding stock in the form of minerals), in particular by means of a roller press apparatus as described above, having the following steps: Driving at least one fixedly mounted fixed roller with an at least approximately positionally fixedly mounted roller axis and a floating roller mounted in a floating manner with a positionally variably arrangeable roller axis; subjecting the floating roller to a force in order to apply a grinding force and to position the floating roller relative to the fixed roller; wherein the floating roller with the positionally variable roller axis is pivoted by the action of force in the manner of a one-sided lever about a pivot axis and in the process the relative position of the floating roller with respect to the fixed roller is defined, wherein the force is made to act at a force action point of the one-sided lever, in particular at a force action point which, in terms of the lever action, is spaced apart at least as far, preferably further, from the positionally variable roller axis as the positionally variable roller axis is from the pivot axis. This provides the advantages mentioned above.

It has been shown that an especially advantageous force action concept with advantageous design options and advantageous kinematics can be realized by means of using a one-sided lever to apply a force (or to apply force in a one-sided lever arrangement with the load arm overlapping the force arm).

The driving operation is described here by way of example for the two rollers. Optionally, only one of the rollers is driven.

According to one embodiment, during the pivoting movement the floating roller is moved in the direction (of rotation) of the action of force. This also makes it possible to ensure a compact arrangement in a stable frame with advantageous conveyance of force.

According to one embodiment, the force is made to act on the force arm of the one-sided lever, with the floating roller being pivoted relative to the fixed roller in such a way that the floating roller makes contact with the fixed roller in the section of the force arm and defines the load arm through the roller contact point or through the feedstock/grinding stock with which contact is made (load arm coincides with force arm in the case of a one-sided lever). This also makes it possible to implement advantageous adjustability. In addition, the selection of the lever ratios also makes it possible to easily optimize the reactivity and/or the force effectiveness of the arrangement.

According to one embodiment, the force is made to act at an angle of at least 60°, preferably at least 75° or at most 30°, preferably at most 15°, in relation to the grinding force (reaction force at the roller contact point), in particular at least approximately orthogonally to the grinding force or at least approximately in the direction of the grinding force, or counter to the grinding force (reaction force). Expressed differently: Various advantages of the present invention can also be realized particularly well when the force is made to act at least approximately in a horizontal direction and/or at least approximately in a vertical direction, with reference to an arrangement of the two roller axes in a horizontal plane. This makes it possible to implement two advantageous force action concepts as alternatives or else in combination with one another, in particular in the case of an at least approximately vertical and/or horizontal action of force. Not least, in this case different advantageous variants for the configuration of the frame may be realized for a respective individual case.

It has been shown that an action of force (in particular by means of hydraulic cylinders) in an at least approximately vertical direction is especially advantageous, in particular in terms of conveying a force (reaction force of the rollers) directly into the stand. Expressed differently: The mounting according to the invention about the pivot axis also enables, among other things, the design concept in which the force is conducted from the grinding gap directly into the stand via the force action points, in particular at least approximately in a vertical direction, with the result that a force deflection from a horizontal force direction to a vertical force direction in some frame parts is no longer necessary or can be largely omitted.

According to one embodiment, the force is made to act at an angle of at least 60°, preferably at least 75°, in relation to the grinding force (reaction force at the roller contact point), in particular at least approximately orthogonally to the grinding force or at least approximately in a vertical direction, in particular vertically upward. This also promotes an advantageous implementation of a narrow frame concept. Optionally, the frame may be open at the top.

According to one embodiment, the force is made to act at an angle of at most 30°, preferably at most 15°, in relation to the grinding force (reaction force at the roller contact point), in particular at least approximately parallel to the grinding force or at least approximately in a horizontal direction. Not least, this also promotes the implementation of the roller concept according to the invention in conventional frames, in particular in the case of a minimized number of actuators, in particular also without the risk of jamming or blocking occurring on translational guides, in particular also when forces are minimized by virtue of advantageous lever ratios. Expressed differently: The roller concept according to the invention may also be implemented, for example, by comparatively simple conversion of existing systems.

According to one exemplary embodiment, the force is made to act (in particular exclusively) at an angle of at most 15° or at most 10° in relation to the grinding force, in particular at least approximately in the direction of the grinding force or counter to the grinding force, in particular in an at least approximately horizontal plane.

According to an alternative exemplary embodiment, the force is made to act (in particular exclusively) at an angle of at least 75° or at least 80° in relation to the grinding force, in particular at least approximately orthogonally to the direction of the grinding force, in particular in an at least approximately vertical plane.

According to one embodiment, the force is made to act in such a way that a force arm of the one-sided lever (effective lever distance between the pivot axis and the force action point) is realized which is at least twice as long as the load arm of the one-sided lever (effective lever distance between the pivot axis and the positionally variable roller axis), in particular at least a factor of 2.5 or a factor of 3 as long. This also makes it possible to achieve a good force effect; in particular, the energy required to provide a predefined action can be effectively minimized.

According to one embodiment, the roller contact force is effected by adjusting the action of force at a force action point at a single predefined distance from the pivot axis. This also makes it possible to provide an especially narrow arrangement.

According to one embodiment, the floating roller is positioned relative to the fixed roller exclusively by way of the pivoting movement, that is to say without translational displacement. In this respect, the pivoting movement may also be initiated exclusively by way of a translatory actuation or action of force, that is to say without torque or without a rotational actuating movement. This makes it possible to especially appreciably realize the advantages according to the invention.

According to one embodiment, the rollers are mounted and supported in such a way that reaction forces in relation to the grinding force are directed into the frame either on the same horizontal plane as the pivot axis and/or as the force action point or at least approximately parallel to the reaction force in the grinding gap, or are conveyed into the frame in an at least approximately vertical direction and/or at least approximately orthogonally to the reaction force in the grinding gap at a counterbearing of the floating roller. Not least, this also provides advantageous force flow paths or a compact or else especially stable frame arrangement. In particular, moments of force can be minimized. Forces in the x direction can be directed into the frame largely free of moments.

The object mentioned above is achieved according to the invention in particular also by an open-loop/closed-loop control device configured to carry out a method as described above, wherein the open-loop/closed-loop control device is configured to control the driving of the fixed roller and/or the floating roller in an open-loop/closed-loop manner and is configured to control the action of force on the floating roller in an open-loop/closed-loop manner, wherein the open-loop/closed-loop control device is in communication with or comprises a measuring device, wherein the open-loop/closed-loop control device is configured, depending on the current measured values of the measuring device, to control the action of force at the force action point on the floating roller in an arrangement in the manner of a one-sided lever about a/the pivot axis of the floating roller in an open-loop/closed-loop manner, in particular by actuating and regulating at least one force action unit with a hydraulic actuator, in particular for the purpose of positioning the floating roller by way of a predefined pivoting movement. This provides the advantages mentioned above.

The object mentioned above is achieved according to the invention in particular also by the use of a pivot axis to mount a floating roller of a material-bed roller mill relative to at least one further roller of the material-bed roller mill, in particular relative to a fixed roller, by an action of force about the pivot axis in the manner of a one-sided lever and by pivoting the floating roller on the force arm of the one-sided lever, in particular to mount a floating roller of a roller press apparatus as described above, in particular in the case of a method as described above, in particular with the pivot axis in an arrangement in the grinding gap (or in line in a vertical plane running through the grinding gap) or at least approximately at the same x distance from the roller axes (i.e. in an at least approximately symmetrical x position between the roller axes). This provides the advantages mentioned above. The pivot axis may be mounted in one or more pivot bearings, in particular on a common frame below the roller axes.

For reference signs not described explicitly with respect to a single figure, reference is made to the other figures. For the purpose of easier understanding, the figures are first described together with reference to all the reference signs. Details or special features shown in the respective figures are described individually. Unless explicitly mentioned otherwise, individual features of the respective exemplary embodiments can be combined with the other exemplary embodiments.

A roller press or a roller press apparatus 10 for grinding feedstock M is arranged in/on a frame 1, 11 and comprises at least one fixed roller 2 and at least one floating roller 3. The floating roller is usually mounted in a translatory manner in at least one plain bearing 4. The frame 11 comprises, for example, a frame part 11*a* on the bottom side and a frame part 11*b* on the top side. The fixed roller is mounted in at least one (fixed) bearing 12.

According to one aspect of the present invention, a floating bearing 13 for the floating roller is configured as a pivot bearing. Furthermore, a counterbearing 14 may be provided to take up reaction forces, in particular comprising a stop against which the fixed roller can be supported with respect to reaction forces. A one-sided lever arrangement 16 can be acted upon by means of a force action unit 15, in particular having at least one hydraulic actuator (for example a plunger with a tilting device) for the purpose of pivoting the floating roller about the pivot axis. The force is introduced at the force arm 16.1 of the one-sided lever and transmitted to the fixed roller via the load arm 16.2. The load arm extends from the pivot axis in the same direction as the force arm and is formed in particular between the pivot axis and the center of gravity of the floating roller or all components that are pivoted together with the floating roller. An open-loop/closed-loop control device 20 is coupled to a measuring device 21, in particular comprising a pivot angle sensor. Individual (relative) distances and action points are explained in more detail below; for details, reference is made to the corresponding figures:

- d1 effective distance or lever arm between the pivot axis and the positionally variable roller axis, in particular distance orthogonally to the force direction in the x or z direction;
- d2 effective distance or lever arm between the positionally variable roller axis and the force action point, in particular distance in the x or z direction;
- d3 lateral distance between the pivot axis and the positionally variable roller axis, in particular distance in the x direction;
- d4 lateral distance between the pivot axis and the positionally fixed roller axis, in particular distance in the x direction;
- d5 distance between the pivot axis and the frame or frame part on the bottom side, in particular in the z direction;
- F (vector) resulting rolling force or roller contact force (grinding force) in the grinding gap or at the contact point;
- F1 (vector) (hydraulic) force exerted on the floating roller, in particular in the x direction;
- F2 (vector) (hydraulic) force exerted on the floating roller, in particular in the z direction counter to the direction of gravitational force;
- P1 roller contact point or (theoretical) force transmission point in the grinding gap;
- P2 (force) action point, in particular for hydraulic force introduced;
- P3 pivot point or pivot axis;
- X0 grinding gap, in particular yz plane through the roller contact point;
- y2 positionally fixed roller axis;
- y3 positionally variable roller axis;
- Z0 free space (pivoting cavity) for floating roller relative to the frame;
- x, y, z longitudinal, transverse and vertical axis or direction.

Figure 4:
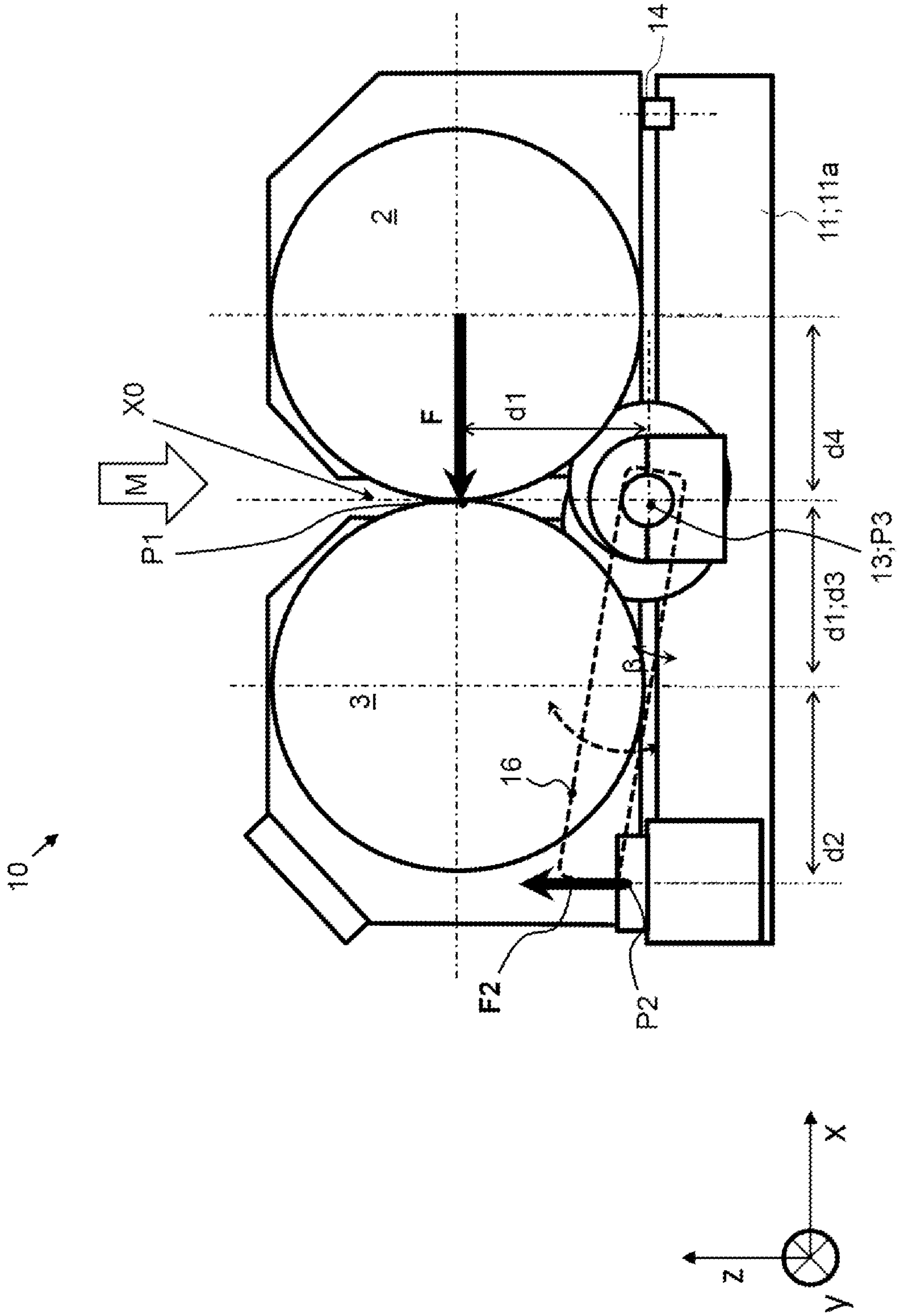
FIG. 4 is a partially sectional side, schematic view of a roller press apparatus according to a further exemplary embodiment.
Figure 5:
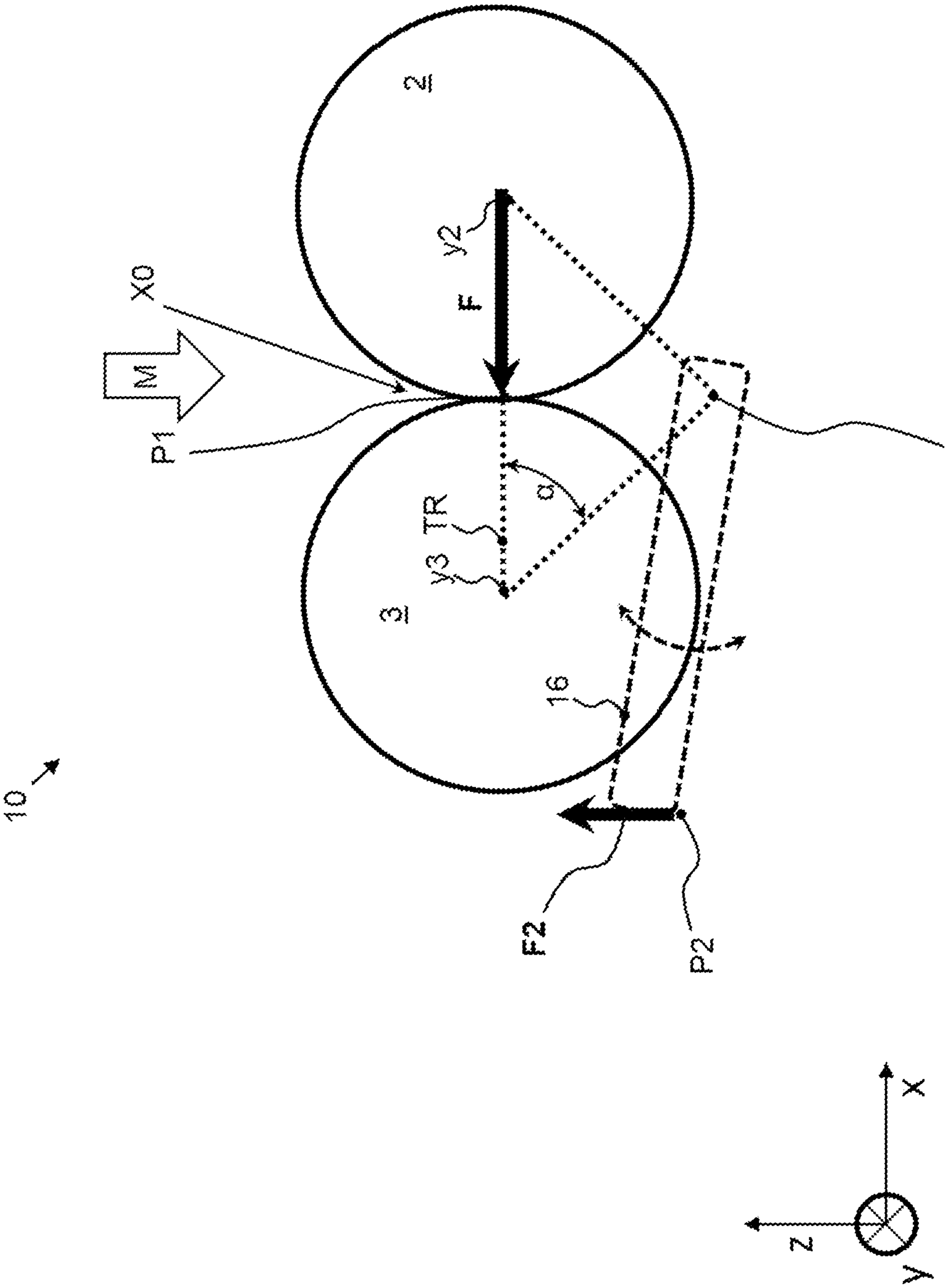
FIG. 5 is a schematic view of a roller press apparatus with a triangle arrangement according to exemplary embodiments.

There now follows a specific reference to the prior art (FIG. 1) and to individual exemplary embodiments of the invention (FIGS. 2 to 5), with FIG. 5 schematically illustrating the roller arrangement or mounting according to the invention that can be implemented in all exemplary embodiments.

FIG. 1 shows a previously known roller press, in which the floating roller is mounted in a translatory manner in the frame 1 in a plain bearing at the top and bottom. A translational displacement of the floating roller with respect to the fixed roller, in particular by way of an action of force at least at two force introduction points, also results in reaction forces in the fixed bearings 12. In this example, the force is made to act at two points (above and below the center of gravity of the floating roller), in particular by means of cylinders, in particular in each case in a horizontal direction corresponding to the translational displacement direction (or in that direction in which the translational plain bearing extends). This type of action of force is caused in particular by a force progression in the frame that is as symmetrical as possible. The contact point of the rollers in the grinding gap is therefore also at least approximately in the center of the frame, at least with respect to the z direction or with respect to the two force action points illustrated (force vector arrows F1, corresponding to the force exerted on the floating roller).

Figure 2:
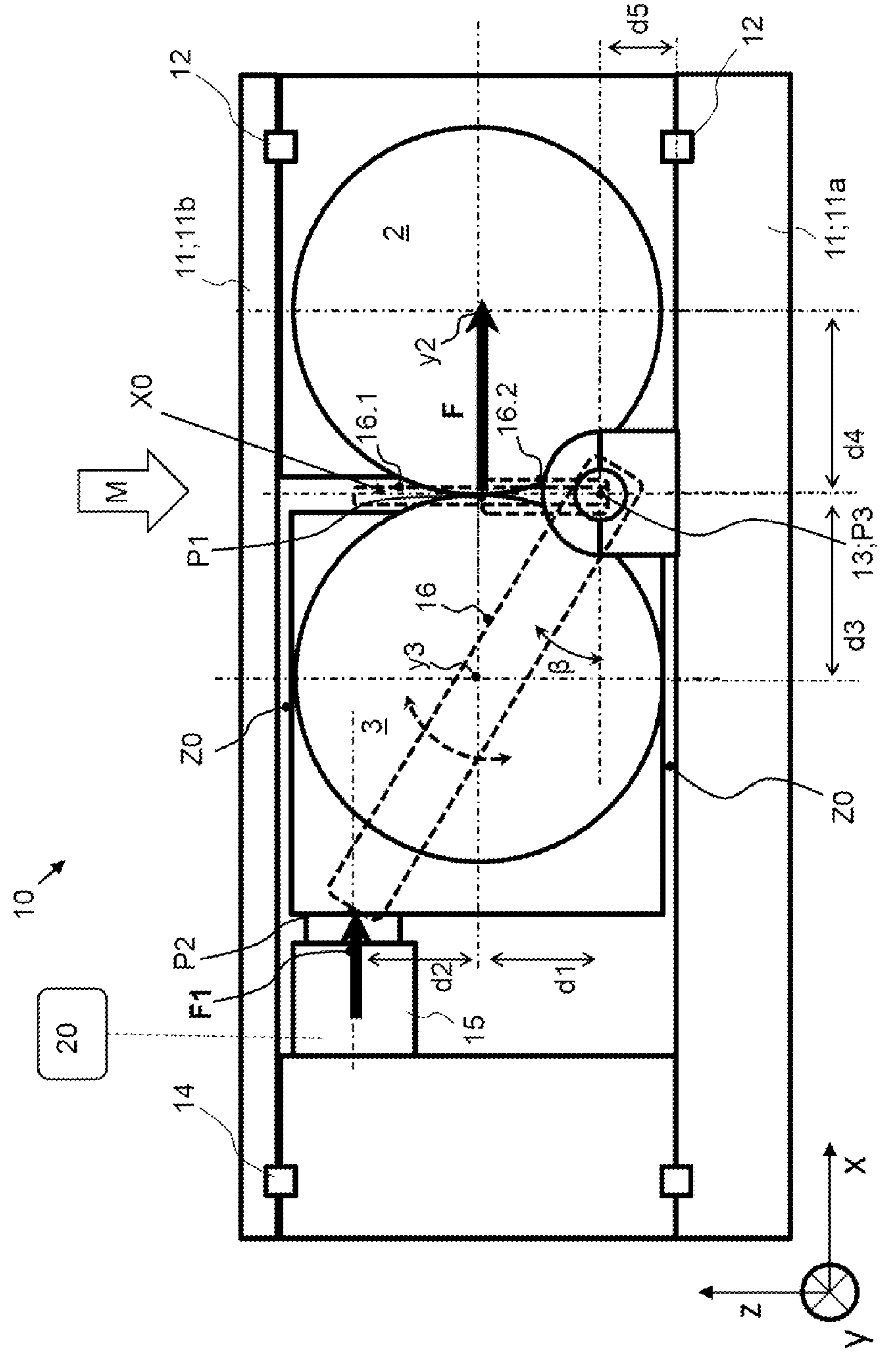
FIG. 2 is a partially sectional side, schematic view of a roller press apparatus according to one exemplary embodiment.

FIG. 2 shows a first variant for forming a one-sided lever arrangement 16 according to the present inventive concept. At point P2, the force is made to act substantially in a horizontal direction (in particular only at a single force action point), with the load arm being approximately half as long as the force arm (d1 approximately equal to d2). The action of force pivots the floating roller. The pivot axis P3 (point of rotation for the pivoting movement) is arranged at least approximately in the grinding gap X0 (d3 approximately equal to d4), i.e. at the same x coordinate. In this case, the force can be made to act selectively at just one point or at multiple points. Expressed differently: By contrast to the structure according to FIG. 1, no symmetrical arrangement of two force action cylinders is required.

FIG. 2 also indicates the effective lever length (dashed line), in a projection orthogonal to the action of force, specifically on the one hand the force arm 16.1 (relatively narrower for illustration purposes), the length of which is defined by the position of the force action point P2, and on the other hand the load arm 16.2 (relatively wider for illustration purposes), the length of which is defined by the force transmission point P1 or by the contact point of the rollers in the grinding gap. The pivoting movement is illustrated by the back-and-forth arrow about the pivot axis P3, 13. Depending on the state of loading and the size or particle spectrum of the feedstock, a pivoting movement during operation can be more or less pronounced.

The floating roller 3 is therefore held in the frame between the points P2 and P3. Optionally, a force is transmitted between the floating roller and the frame only at these points, and indirectly also via the contact point P1.

In this respect, the at least one force action unit 15 may also be configured to actuate in both directions of action (opposite pivoting directions) (in particular both tensile and compressive forces). Optionally, there is actuation only against the fixed roller, in particular since the floating roller can advantageously be pivoted back (purely) under the effect of gravitational force. Not least, this also promotes fast, reactive and thus low-load operating behavior, even in the case of comparatively massive, heavy rollers. Not least, the way in which the force is made to act in the grinding gap can also be adapted or optimized comparatively easily, in particular depending on the feedstock. Expressed differently: By contrast to the translational mounting shown in FIG. 1, no great force is required to move the floating roller back out of the grinding gap (to the left in FIG. 1). This may also provide advantages in terms of the design of the frame and/or the selection of the drives/actuators.

A triangle of forces that is defined by the points P1, P2 and P3 can also be described using the example of FIG. 2. The respective roller axis is less significant in this context. The greater the distance P2/P3 (in particular in the z direction) is in relation to the distance P1/P3, the smaller the design of the hydraulic cylinders or force introduction actuators can be. On the other hand, in the case of a large z distance P2/P3, the load at point P3, i.e. the load acting on the pivot axis, also increases (in particular large lever force when the rollers make contact). A ratio of P2/P3 to P1/P3 of at least approximately 1 to 2 may be preferred, in particular when the number of cylinders (force action actuators) should be as low as possible (on the basis of a translational mounting: in particular should be halved). In many cases, cost aspects are also of great importance, and therefore the ratio of the distances is also optimized in cost terms. If the design costs for the mounting point P3 rise to a greater extent than the costs for the cylinders, the ratio is/will be selected to be smaller if anything, and vice versa. In this respect, the ratio may also be selected in individual cases in a range from, for example, 1:1 to 1:3, in particular 1:1.5 to 1:2.5, preferably 1:2.

Figure 3:
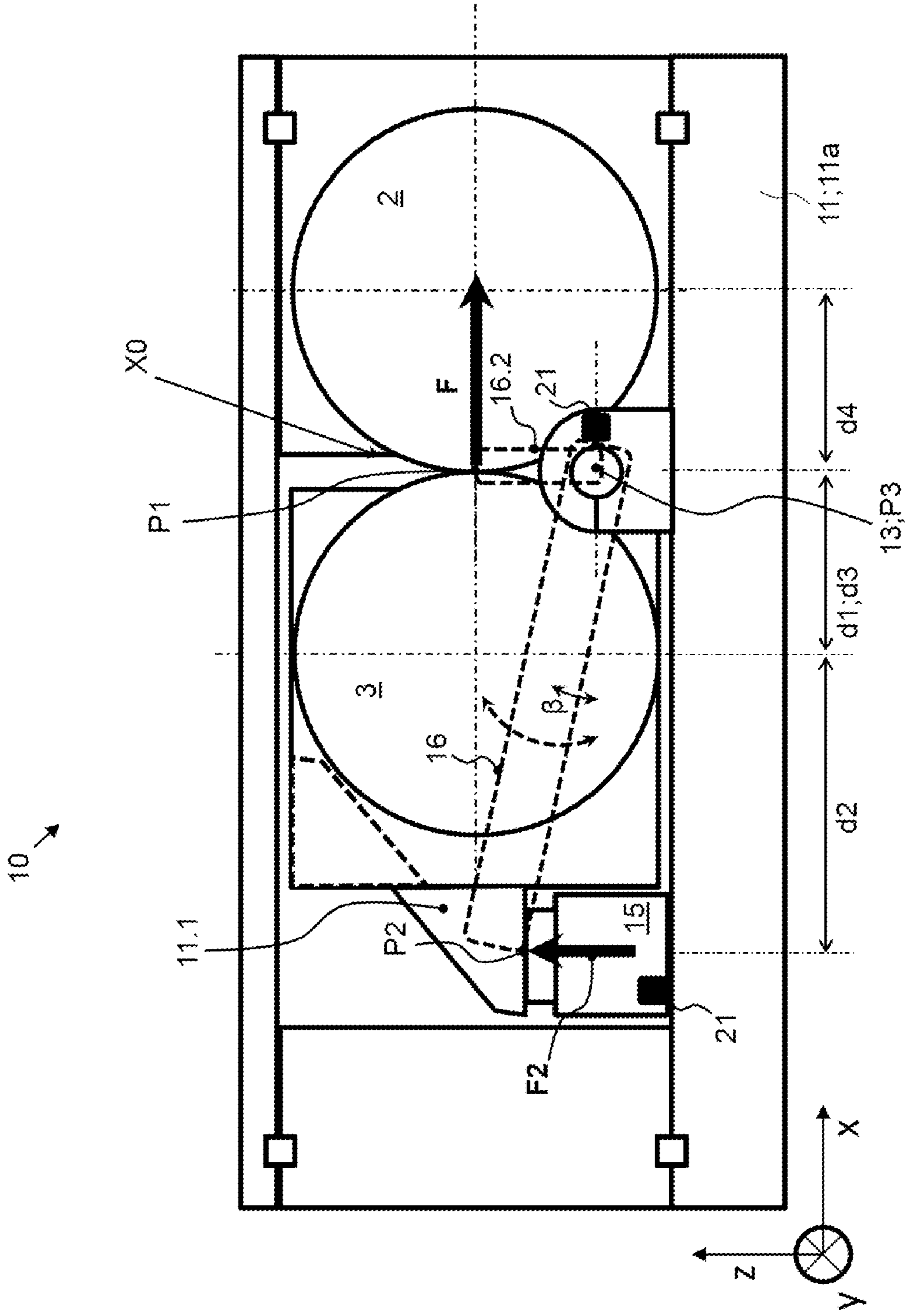
FIG. 3 is a partially sectional side, schematic view of a roller press apparatus according to a further exemplary embodiment.

FIG. 3 shows a second variant for forming a one-sided lever arrangement 16 according to the present inventive concept. At point P2, the force is made to act substantially in a vertical direction or substantially orthogonally to the reaction force F at the roller contact point (in particular also at least approximately orthogonally to a plane of extent of the bottom frame part or a stand), with the load arm 16.2 being significantly shorter than one half of the force arm 16.1 (z distance P1 to P3<x distance P2 to P3). The pivot axis P3 is arranged in the grinding gap X0 (distance d3 approximately equal to distance d4).

In this arrangement, the action of the gravitational force is especially effective. The floating roller can be mounted in a particularly reactive manner in terms of a return movement, and the pivot axis can be relieved of load at least to a certain extent with regard to the weight force of the floating roller.

From a design perspective, in the case of an arrangement according to FIG. 3, a frame section laterally to the outside of the floating roller can be given a comparatively weak configuration or can be omitted entirely. Force can be conveyed from the floating roller to the frame in particular also by means of a diagonally connecting support or similar crossmember between the floating roller and the frame, in particular by means of a frame support 11.1 or strut, in particular with a directional specification for the force flow. Such a transverse support is advantageously connected directly or indirectly to a bottom side of the frame or else directly to a stand. The conveyance of force from the floating roller to the frame can be deflected in this way, in particular with a specified direction into the stand. Effect: Force can be conveyed with very low load, and the frame can be given a correspondingly narrow configuration.

FIG. 4 shows a third variant for forming a one-sided lever arrangement 16 according to the present inventive concept. FIG. 4 illustrates multiple aspects which can each be advantageous per se, but which do not necessarily have to be implemented in combination with one another, in particular the following aspects: advantageously narrow structure; advantageous force flow path; advantageous coupling of force to a/the stand (not illustrated; below frame part 11*a*); synergistic support of the rollers, in particular advantageous utilization of the pivot axis 13 as common bearing axis (in particular for the purpose of compensating reaction forces).

At point P2, the force is made to act substantially in a vertical direction or at least approximately orthogonally to the reaction force at the roller contact point, with the load arm 16.2 being approximately half as long as the force arm (d1 approximately equal to d2). The pivot axis P3 is arranged in the grinding gap X0 (d3 approximately equal to d4), i.e. at the same x position below the roller contact point. A special feature to be emphasized is that the fixed roller can optionally be mounted about the same pivot axis P3 or on the same pivot axis P3 as the floating roller and is supported against the counterbearing 14 with respect to reaction forces about the pivot axis. Only the floating roller 3 is actively relatively positioned. However, the counterbearing 14 may optionally also be a fixed bearing to which the fixed roller is positionally fixedly coupled (for example bearing jewel 14 screwed to the frame). Expressed differently: As is also made clear by the term "fixed roller", a relative movement of the fixed roller is not necessarily required, i.e. not even when the pivot axis is used as a bearing axis for the fixed roller. Rather, the design shown in FIG. 4 optionally also provides the design advantage that the pivot axis of the floating roller may also be used to mount the fixed roller, in particular with regard to compensation of forces in the x direction.

The frame 11 has only one frame part 11*a* arranged on the bottom side. It can advantageously be coupled directly to a stand (not illustrated), thereby promoting advantageous conveyance of force, in particular in the case of very massive, large roller apparatuses. In particular, there is no need for weight-force components or reaction forces caused by the grinding operation to be introduced laterally into the side of a frame. It can in particular also be seen from FIG. 4 that a configuration of the frame 11 without a frame part on the top side provides further advantages, for example in terms of general accessibility and/or in terms of the material feed M.

FIG. 5 describes, in general with reference to all the exemplary embodiments according to the invention that are described above, a relative arrangement of the axes (pivot axis and roller axes) relative to one another in a triangle arrangement (with the triangular geometry of a triangle standing on its apex), with a purely geometrically illustrative dashed line indicating the arrangement of the roller axes y2, y3, which is symmetrical in relation to the pivot axis 13. An at least approximately isosceles triangle TR is defined by the respective axis y2, y3, 13 as corner points, with the base angle $\alpha$ advantageously being as small as possible. The isosceles triangle arrangement TR is produced in particular when the rollers make direct contact (grinding gap at least approximately zero or non-existent). If the rollers are spaced apart relative to one another, for example owing to feedstock in the grinding gap, the base angle will be correspondingly smaller.

In an arrangement according to FIG. 4, the base angle $\alpha$ of the triangle arrangement TR is still comparatively large, in particular in the region of 45°; in the case of an arrangement according to FIG. 2 or FIG. 3 (pivot axis comparatively close to roller contact point P1 in the z direction), the base angle $\alpha$ is comparatively small, in particular in the range of only approximately 25° to 35°. Expressed differently: the pivot axis is advantageously arranged at a (z) distance from the roller axes that is less than half of the roller diameter. Depending on the configuration of the frame and the mounting, the base angle $\alpha$ may assume a magnitude in the range of 20 to 50 degrees, for example (or even up to 60 degrees in an individual case).

It has been shown that, by means of such a triangle arrangement TR, a great number of the advantages of the invention can be generally ensured in each of the different exemplary embodiments, irrespective of the specific usage situation. The design concept according to the invention can therefore advantageously specifically also be realized by such triangle arrangements TR, in particular with the magnitude of the base angle or with the relative arrangement of the pivot axis in each case being a design parameter. As explained above, the relative x position and/or relative z position of the pivot axis can also be adapted individually, for example slightly relatively offset toward the axis of rotation of the floating roller and displaced out of the grinding gap. The triangle arrangement TR is preferably an isosceles triangle arrangement. However, the triangle arrangement TR is not necessarily exclusively only an isosceles triangle arrangement; rather, it is within the scope of expert adaptation in the art to optimize the two base angles at least within a narrow range of variation for the respective usage situation.

FIGS. 2 to 5 schematically indicate the one-sided lever (one-sided lever arrangement) 16 by way of a dashed line, which extends from the pivot axis 13 to the/to a force action point P2. The respective effective lever length (FIG. 2) is to be dimensioned in absolute terms, in particular orthogonally to the force direction. The illustration based on a dashed line was therefore selected by the applicant because the section in which the one-sided lever is formed can be defined individually depending on the specific selectable position for the force action point, as can the length of the lever, and also the length ratio between force arm and load arm. Irrespective of this, the floating roller is arranged both in the region of the load arm and in the region of the force arm, or these regions overlap (one-sided lever arrangement without a free load arm, i.e. without a rocker).

Figure 6:
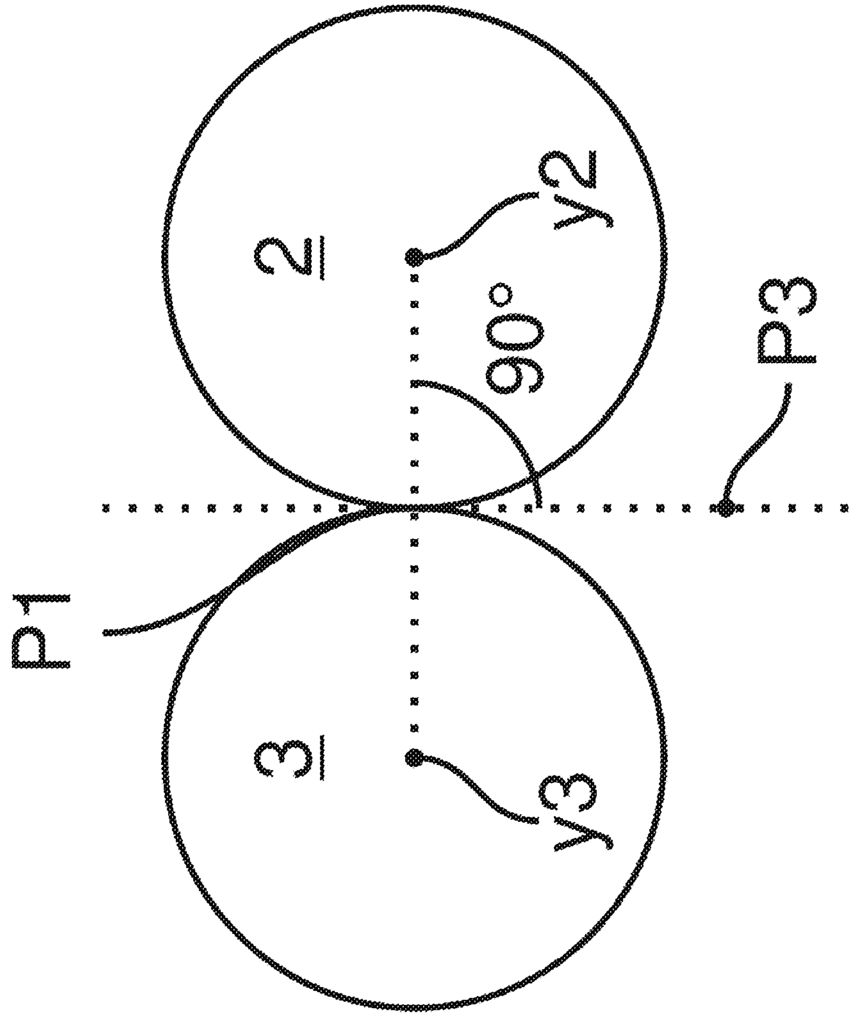
FIG. 6 is a schematic view of rollers with a grinding gap of 0.

FIG. 6 shows, in a highly simplified manner, only the fixed roller 2 and the floating roller 3 in relation to the pivot axis P3. A connecting line is depicted between the positionally fixedly mounted roller axis y2 and the positionally variably arrangeable roller axis y3. This connecting line intersects the fixed roller 2 and the floating roller 3 at the roller contact point P1. The tangent of the fixed roller 2 and the floating roller 2 is perpendicular to this connecting line and runs through the pivot axis P3.

Figure 7:
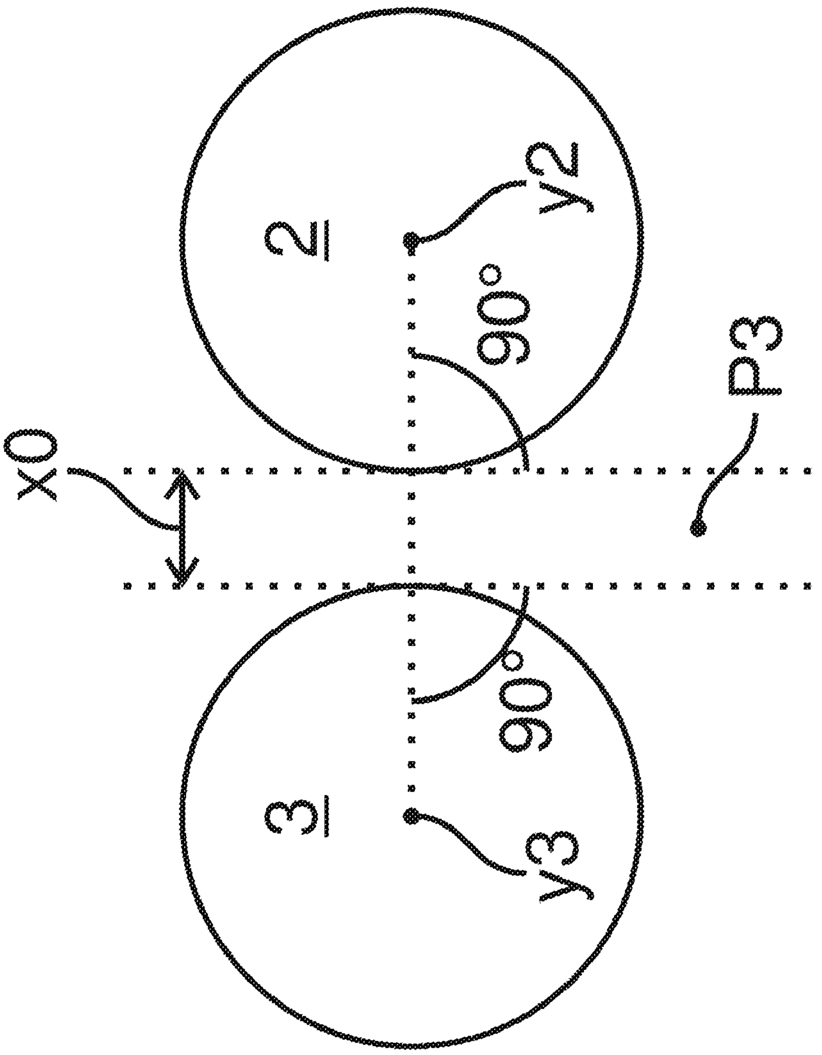
FIG. 7 is a schematic view of rollers with a grinding gap of >0.

FIG. 7 shows a very extremely oversized grinding gap X0. In reality, the grinding gap X0 will be much smaller than the radius of the fixed roller 2 and the radius of the floating roller 3. The distance between the fixed roller 2 and the floating roller 3 now results in two spaced-apart tangents. In the example shown, the pivot axis P3 is arranged exactly centrally between the tangents.

LIST OF REFERENCE SIGNS

1 Frame
2 Fixed roller
3 Floating roller
4 Plain bearing
10 Roller press apparatus
11 Frame
11*a* Frame part on the bottom side
11*b* Frame part on the top side
11.1 Frame support or strut, in particular with directional specification for force flow
12 (Fixed) bearing for fixed roller
13 Floating bearing for floating roller, in particular pivot bearing
14 Counterbearing for reaction forces

15 Force action unit, in particular hydraulic actuator, in particular plunger with tilting device

16 One-sided lever or one-sided lever arrangement

16.1 Force arm

16.2 Load arm

20 Open-loop/closed-loop control device

21 Measuring device, in particular with pivot angle sensor d1 Effective distance or lever arm between pivot axis and positionally variable roller axis, in particular distance orthogonal to the force direction in the x or z direction d2 Effective distance or lever arm between positionally variable roller axis and force action point, in particular distance in the x or z direction d3 Lateral distance between the pivot axis and the positionally variable roller axis, in particular distance in the x direction d4 Lateral distance between the pivot axis and the positionally fixed roller axis, in particular distance in the x direction d5 Distance between pivot axis and frame or frame part on the bottom side, in particular in the z direction F Resulting rolling force or roller contact force (grinding force) in the grinding gap or at the contact point F1 (hydraulic) force exerted on the floating roller, in particular in the x direction F2 (hydraulic) force exerted on the floating roller, in particular in the z direction M Feedstock P1 Roller contact point or (theoretical) force transmission point in the grinding gap P2 (Force) action point, in particular for hydraulic force introduced P3 Pivot point or pivot axis TR Isosceles triangle α Base angle β Alignment of the one-sided lever relative to the horizontal plane X0 Grinding gap, in particular yz plane through the roller contact point y2 Positionally fixed roller axis y2 Positionally variable roller axis Z0 Free space (pivoting cavity) for floating roller relative to the frame x, y, z Longitudinal, transverse and vertical axis or direction

What is claimed is:

1. A roller press apparatus configured as a roller mill for grinding feedstock, comprising:

a fixedly mounted fixed roller with an at least approximately positionally fixedly mounted roller axis;

a floating roller mounted in a floating manner with a positionally variable roller axis that is positionally variably arrangeable relative to the fixed roller;

a frame on which the fixed roller is mounted;

a force action unit configured to act on the floating roller at a force action point;

wherein by way of the force action unit, the fixed and floating rollers are mountable and positionable relative to one another for applying a grinding force and making mutual contact at a roller contact point or defining a grinding gap for the feedstock, wherein the floating roller is mounted so that the floating roller is pivotable about a pivot axis in a manner of a one-sided lever such that a relative position of the floating roller relative to the fixed roller is definable by a pivoting movement, wherein the one-sided lever is disposed between the pivot axis and the force action point;

wherein the pivot axis is arranged on a tangent of the fixed roller and the floating roller at the roller contact point or, in the case of a non-zero grinding gap, the pivot axis is arranged between the tangent of the fixed roller at an intersection point of a connecting line between the positionally fixedly mounted roller axis and the positionally variable roller axis and a tangent of the floating roller at the intersection point.

2. The roller press apparatus of claim 1 wherein a distance between the pivot axis and the connecting line between the positionally fixedly mounted roller axis and the positionally variable roller axis along a straight line extending at right angles to the connecting line between the positionally fixedly mounted roller axis and the positionally variable roller axis and through the pivot axis corresponds to at least 0.15 times to at most 1.0 times a sum of a radius of the fixed roller and a radius of the floating roller.

3. The roller press apparatus of claim 1 wherein a distance between the pivot axis and the force action point corresponds to 1 to 5 times a distance between the pivot axis and the connecting line between the positionally fixedly mounted roller axis and the positionally variable roller axis along a straight line extending at right angles to the connecting line between the positionally fixedly mounted roller axis and the positionally variable roller axis and through the pivot axis.

4. The roller press apparatus of claim 1 wherein the one-sided lever comprises a straight connecting line between the force action point and the pivot axis.

5. The roller press apparatus of claim 4 wherein the positionally variable roller axis extends through the one-sided lever.

6. The roller press apparatus of claim 4 wherein the positionally variable roller axis is spaced apart from the straight connecting line by at most 0.1 times a length of the straight connecting line.

7. The roller press apparatus of claim 1 configured such that the grinding force acts at the force action point at an angle of 75° to 105° relative to the connecting line between the positionally fixedly mounted roller axis and the positionally variable roller axis.

8. The roller press apparatus of claim 1 wherein the roller contact point is disposed in a section between the force action point and the pivot axis and/or is disposed at a distance from the pivot axis that is less than a length of the one-sided lever, wherein the roller contact point defines a load arm of the one-sided lever.

9. The roller press apparatus of claim 1 configured such that when the rollers make contact at the roller contact point the axes of the rollers are arranged relative to the pivot axis such that a connecting line through the roller axes and the pivot axis in a plane running orthogonally thereto forms a triangle or a triangular arrangement, with each base angle on the connecting line between the roller axes being less than 50 degrees.

10. The roller press apparatus of claim 1 wherein the floating roller is pivotably mounted and arranged such that a gravitational force acting at a center of gravity of the floating roller acts on a load arm of the one-sided lever in a direction of a return movement so as to enlarge the grinding gap.

11. The roller press apparatus of claim 1 configured such that the grinding force acts about the pivot axis by way of a plunger with a hydrostat as a tilting device.

12. A method for grinding the feedstock with the roller press apparatus of claim 1, the method comprising:

driving the fixedly mounted fixed roller with the at least approximately positionally fixedly mounted roller axis and the floating roller mounted in the floating manner with the positionally variable roller axis;

subjecting the floating roller to a force to apply the grinding force and to position the floating roller relative to the fixed roller; and pivoting the floating roller with the positionally variable roller axis about the pivot axis, thereby defining the relative position of the floating roller relative to the fixed roller, wherein the force is made to act at the force action point , wherein in terms of lever action the force action point is spaced apart at least as far from the positionally variable roller axis as the positionally variable roller axis is from the pivot axis.

13. The method of claim 12 wherein a force acts on a force arm of the one-sided lever, wherein the floating roller is pivoted relative to the fixed roller such that the floating roller makes contact with the fixed roller in a section of the force arm and defines a load arm through the roller contact point or through the feedstock with which contact is made.

14. The method of claim 12 wherein the floating roller is positioned relative to the fixed roller exclusively by way of the pivoting movement, without a translational displacement.

15. The method of claim 14 wherein the pivoting movement is initiated exclusively by a translatory actuation or action of force, without torque and without a rotational actuating movement.

16. The method of claim 12 wherein the pivoting movement is initiated exclusively by a translatory actuation or action of force, without torque and without a rotational actuating movement.

* * * * *